(12) United States Patent
Yang et al.

(10) Patent No.: US 11,528,167 B2
(45) Date of Patent: Dec. 13, 2022

(54) METHOD AND DEVICE FOR IMPLEMENTING GATEWAY COOPERATION, IOT GATEWAY AND STORAGE MEDIUM

(71) Applicant: ZTE Corporation, Shenzhen (CN)

(72) Inventors: Kun Yang, Shenzhen (CN); Chen Lu, Shenzhen (CN); Fang Xie, Shenzhen (CN)

(73) Assignee: ZTE CORPORATION, Shenzhen (CN)

( * ) Notice: Subject to any disclaimer, the term of this patent is extended or adjusted under 35 U.S.C. 154(b) by 0 days.

(21) Appl. No.: 17/292,282

(22) PCT Filed: Nov. 4, 2019

(86) PCT No.: PCT/CN2019/115377
§ 371 (c)(1),
(2) Date: May 7, 2021

(87) PCT Pub. No.: WO2020/093979
PCT Pub. Date: May 14, 2020

(65) Prior Publication Data
US 2021/0409243 A1 Dec. 30, 2021

(30) Foreign Application Priority Data
Nov. 9, 2018 (CN) .......................... 201811331375.0

(51) Int. Cl.
*H04L 12/66* (2006.01)
*H04L 41/0816* (2022.01)

(52) U.S. Cl.
CPC .......... *H04L 12/66* (2013.01); *H04L 41/0816* (2013.01)

(58) Field of Classification Search
CPC ......... H04L 67/12; H04L 12/66; H04L 41/12; H04L 41/0668; H04L 41/0816
See application file for complete search history.

(56) References Cited

U.S. PATENT DOCUMENTS 9,729,581 B1 *  8/2017  Skene ..................... H04L 67/10
10,244,086 B2 *  3/2019  Newman, Jr. ....... H04L 12/2836
(Continued)

FOREIGN PATENT DOCUMENTS

CN   103200094 A   7/2013
CN   108075912 A   5/2018
(Continued)

OTHER PUBLICATIONS

International Search Report for corresponding application PCT/CN2019/115377 filed Nov. 4, 2019; dated Jan. 22, 2020.
(Continued)

*Primary Examiner* — Shean Tokuta
(74) *Attorney, Agent, or Firm* — Cantor Colburn LLP

(57) ABSTRACT

Embodiments of the present disclosure provide a method and device for implementing gateway cooperation, a gateway and a storage medium. The method for implementing the gateway cooperation includes: selecting, from gateways in an IoT network, at least one cooperative gateway for a target gateway; notifying the target gateway of the at least one cooperative gateway, wherein the at least one cooperative gateway is used for establishing cooperation with the target gateway and performing cooperative management.

17 Claims, 5 Drawing Sheets

(56) References Cited

U.S. PATENT DOCUMENTS

| | | | | |
|---|---|---|---|---|
| 2002/0099937 | A1* | 7/2002 | Tuomenoksa | H04L 61/00 713/153 |
| 2009/0310571 | A1* | 12/2009 | Matischek | H04W 72/0406 370/336 |
| 2012/0059903 | A1* | 3/2012 | Kim | H04L 67/12 709/217 |
| 2014/0029411 | A1* | 1/2014 | Nayak | G16H 40/67 370/219 |
| 2015/0350374 | A1* | 12/2015 | Soneda | H04W 40/02 714/4.12 |
| 2016/0353326 | A1* | 12/2016 | Novo Diaz | H04L 67/1036 |
| 2017/0163329 | A1* | 6/2017 | Dangy-Caye | H04L 12/66 |
| 2018/0139274 | A1* | 5/2018 | Gandhi | H04W 4/00 |
| 2018/0152517 | A1* | 5/2018 | Zhong | H04L 43/04 |
| 2018/0212863 | A1 | 7/2018 | Akcan | |
| 2018/0220479 | A1* | 8/2018 | Shu | H04W 36/00 |
| 2018/0309818 | A1* | 10/2018 | Park | H04L 43/08 |
| 2019/0124590 | A1* | 4/2019 | Chiang | H04L 12/2809 |
| 2019/0380063 | A1* | 12/2019 | Hu | H04W 28/08 |
| 2020/0059976 | A1* | 2/2020 | Bhatia | H04W 8/005 |
| 2020/0287976 | A1* | 9/2020 | Theogaraj | G06N 20/00 |
| 2021/0021477 | A1* | 1/2021 | Yang | H04L 41/12 |
| 2021/0136869 | A1* | 5/2021 | Radmand | H04W 84/18 |
| 2021/0211960 | A1* | 7/2021 | Ryu | H04W 36/14 |
| 2021/0250243 | A1* | 8/2021 | Yang | H04L 67/1095 |
| 2021/0409243 | A1* | 12/2021 | Yang | H04L 41/0816 |

FOREIGN PATENT DOCUMENTS

| | | | | |
|---|---|---|---|---|
| CN | 112512021 | A * | 3/2021 | H04W 28/0289 |
| KR | 1020180072319 | A | 6/2018 | |
| WO | 2017210259 | A1 | 12/2017 | |
| WO | 2018086305 | A1 | 5/2018 | |
| WO | WO-2020093979 | A1 * | 5/2020 | H04L 12/66 |

OTHER PUBLICATIONS

European Search Report for corresponding application EP19881761; dated Oct. 21, 2021.

* cited by examiner

METHOD AND DEVICE FOR IMPLEMENTING GATEWAY COOPERATION, IOT GATEWAY AND STORAGE MEDIUM

CROSS REFERENCE

This application is a National Stage Filing of the PCT International Application No. PCT/CN2019/115377 filed on Nov. 4, 2019, which claims priority to Chinese Application No. 201811331375.0 filed on Nov. 9, 2018, the entirety of which is herein incorporated by reference.

TECHNICAL FIELD

The present disclosure relates to the field of communications, and in particular, to a method and device for implementing gateway cooperation, an Internet of Things (IoT) gateway and a storage medium.

BACKGROUND

With the gradual expansion of the scope of IoT applications, the forms of the IoT applications also exhibit characteristics of being scaled up and diversified. On the one hand, the regional span of a single IoT network (such as an intelligent traffic control network) is expanding continuously. On the other hand, to implement different function requirements, multiple IoT networks (such as the smart urban system) may be deployed at the same time in the same physical location. In these IoT networks, multiple IoT gateways are usually deployed at the same time to collect and process data. However, calculation and storage capabilities of each IoT gateway are limited; therefore, in order to meet the requirements of data processing, in the related art, a network manager configures a cooperation relationship for each IoT gateway, and at least two IoT gateways that are mutual cooperative gateways manage data of each other together. However, since the cooperation relationship is specified and configured by network management personnel, and the cooperation relationship is directly configured in gateways serving as cooperative gateways of each other, the cooperation relationship between the IoT gateways will not change basically, which results in a stiffening of the cooperation relationship. Therefore, the flexibility and extensibility of the gateway cooperation implementation solution in the related art are relatively poor.

SUMMARY

A method and device for implementing gateway cooperation, a gateway and a storage medium provided in the embodiments of the present disclosure can solve the problem that the flexibility and extensibility of a gateway cooperation implementation solution in the related art are poor.

In order to solve the above technical problem, embodiments of the present disclosure provide a device for implementing gateway cooperation, which includes a cooperative gateway selection module.

The cooperative gateway selection module is configured to select at least one cooperative gateway for a target gateway from gateways in an Internet of Things (IoT) network, and notify the target gateway of the at least one cooperative gateway. The at least one cooperative gateway is used for establishing cooperation with the target gateway and performing cooperative management.

Embodiments of the present disclosure also provide a method for implementing gateway cooperation, including the following operations:

selecting at least one cooperative gateway for a target gateway from gateways in an IoT network; and notifying the target gateway of the at least one cooperative gateway, wherein the at least one cooperative gateway is used for establishing cooperation with the target gateway and performing cooperative management.

Embodiments of the present disclosure also provide an IoT gateway. The IoT gateway includes the device for implementing the gateway cooperation.

Embodiments of the present disclosure also provide a storage medium. The storage medium stores a program for implementing gateway cooperation. The program for implementing the gateway cooperation, when being executed by one or more processors, causes the one or more processors to implement the operations of the method for implementing the gateway cooperation.

The embodiments of the present disclosure provide a method and device for implementing gateway cooperation, a gateway and a storage medium. The device for implementing the gateway cooperation may be deployed in a gateway. When the gateway serves as a key gateway, the gateway may select, from gateways in an IoT network, at least one cooperative gateway for a target gateway, and then notify the target gateway the at least one cooperative gateway, so that the target gateway establishes cooperation with the corresponding cooperative gateway and performs cooperation management. The solution provided in the embodiments takes advantage of the cooperation between the target gateway and at least one cooperative gateway of the target gateway to improve the data processing capability of the target gateway and the at least one cooperative gateway of the target gateway. In addition, since the at least one cooperative gateway of the target gateway is selected by a central gateway, the cooperation relationship between the IoT gateways does not need to be configured by network management personnel, which avoids the stiffening problem caused by artificially configuring the cooperation relationship. When a new IoT gateway joins the IoT network or there is a gateway in the IoT network whose cooperation relationship needs to be changed, the central gateway can complete the selection directly and configure the target gateway correspondingly, so that the flexibility and expandability of the solution for implementing the gateway cooperation are improved. In addition, because the solution for implementing the gateway cooperation reduces the dependence on network management personnel, the requirement of the gateway cooperation on human resources is reduced, and optimal configuration of resources is facilitated.

Additional features and corresponding advantages of the embodiments of the present disclosure will be set forth in the description which follows, and in part will be readily apparent from the description of the present disclosure.

BRIEF DESCRIPTION OF THE DRAWINGS

Drawings, provided for further understanding of the present disclosure and forming a part of the specification, are used to explain the present disclosure together with exemplary embodiments of the present disclosure rather than to limit the present disclosure. In the drawings.

DETAILED DESCRIPTION OF THE EMBODIMENTS

In order to make the objects, technical solutions and advantages of the embodiments of the present disclosure more apparent, the embodiments of the present disclosure will be further described in detail below with reference to the accompanying drawings by way of exemplary embodiments. It should be understood that the exemplary embodiments described herein are only used to explain the embodiments of the present disclosure and are not intended to limit the present disclosure.

Embodiment 1

In the architecture of a mobile network, a network element (or a network function) of a core network consists of a control plane function and a user plane function. In the conventional network architecture, such as a 3G (3rd Generation Telecommunication) network or a 4G (4th Generation mobile communication technology) network, user plane gateways are often deployed in a centralized manner, and are at a core layer relatively far from a user. In order to satisfy requirements of scenarios of a low delay and a large bandwidth, in the optimization of the 4G network architecture or the design of the new 5G network architecture, the user plane function is subsided and deployed at a network edge, thereby reducing a transmission delay and reducing a transmission pressure on a backhaul network.

An IoT gateway is a hub that connects a sensing network to a traditional communications network. In a wireless sensing network, the IoT gateway is an indispensable core device. An IoT device at the ending of a network usually has limited resources in terms of calculation and storage, and therefore cannot support a conventional TCP/IP (Transmission Control Protocol/Internet Protocol) protocol stack, and can only run a simple communication protocol. Therefore, an IoT gateway needs to execute a relevant protocol conversion function, so as to support an access control request from the Internet.

Figure 1:
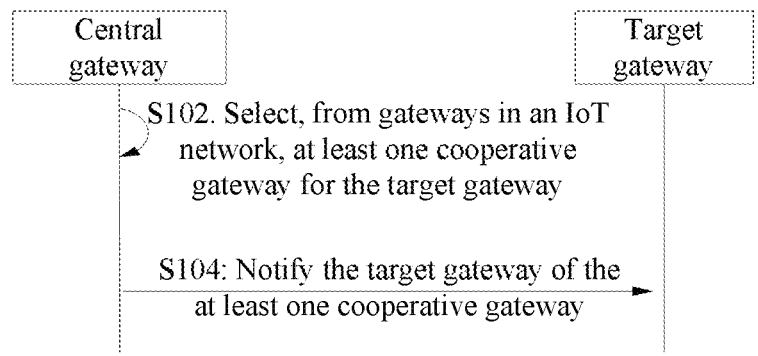
FIG. 1 is a flowchart of a method for implementing gateway cooperation according to Embodiment 1 of the present disclosure.

In some IoT networks, multiple IoT gateways are usually deployed at the same time to collect and process data. After a certain amount of data is collected or pre-processed, because the calculation and storage capabilities of the gateways are relatively limited, the gateways periodically report the data to an IoT application server through the IoT network for further processing. In order to improve the processing capabilities of the IoT gateways and satisfy the further requirements of an application for the IoT gateways, a solution for implementing the gateway cooperation emerges as required. However, the solution for implementing the gateway cooperation in the related art has poor flexibility and expandability. In order to improve the flexibility and expandability of the solution for implementing the gateway cooperation, and lower the dependence of a gateway cooperation process on the human resources, the present embodiment provides a method for implementing gateway cooperation. As shown in FIG. 1, the method for implementing the gateway cooperation includes operations S102 and S104.

In operation S102, a central gateway selects at least one cooperative gateway for a target gateway from gateways in an IoT network.

Figure 2:
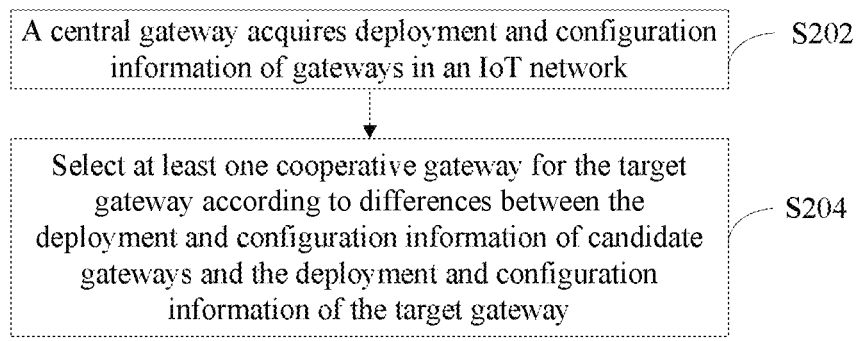
FIG. 2 is a flowchart of selecting at least one cooperative gateway for a target gateway by a central gateway according to Embodiment 1 of the present disclosure.

In this embodiment, the cooperation relationship of the gateways in the IoT network is configured by the central gateway, that is, the cooperative gateway of each gateway is selected and configured by the central gateway. The process that the central gateway selects, from the gateways in the IoT network, the at least one cooperative gateway for the target gateway to which at least one cooperative gateway needs to be configured will be introduced below with reference to FIG. 2. As shown in FIG. 2, the process includes operations S202 and S204.

In operation S202, the central gateway acquires deployment and configuration information of gateways in the IoT network.

The deployment and configuration information of the IoT gateways includes at least one of physical deployment location of the IoT gateway, network topology relationship, and network services carried by the IoT gateway. It can be understood that "the gateways in the IoT network" include the central gateway itself in addition to other ordinary gateways. Therefore, when acquiring the deployment and configuration information of the gateways in the IoT network, the central gateway also acquires the deployment and configuration information of the central gateway itself.

In this embodiment, the deployment and configuration information of an IoT gateway may represent at least one of the following: location information of the gateway, a topological relationship, and service information carried by the gateway. For example, the deployment and configuration information of the IoT gateway may represent the location information of the gateway, may also represent the topological relationship of the gateway, or may represent both the location information and the topological relationship of the IoT gateway. In an example of this embodiment, the deployment and configuration information of the IoT gateway may be encoding information acquired by encoding, by the central gateway, according to the location information of the IoT gateway. In another example of this embodiment, the deployment and configuration information of the IoT gateway may be encoding information acquired by encoding, by the central gateway, according to the topology information of the IoT gateway. Alternatively, the deployment and configuration information of the IoT gateway may also be encoding information acquired by encoding, by the central gateway, according to the location information and the topology information of the IoT gateway.

In operation S204, the central gateway selects at least one cooperative gateway for the target gateway according to differences between the deployment and configuration information of candidate gateways and the deployment and configuration information of the target gateway.

For a target gateway to which at least one cooperative gateway needs to be configured, the at least one cooperative gateway of the target gateway is selected by a central gateway from other gateways except the target gateway itself. Therefore, for the target gateway, candidate gateways of the cooperative gateway are other gateways except the target gateway in the IoT network. For ease of description, gateways except the target gateway in the IoT network are referred to as candidate gateways of the target gateway in the subsequent description. After acquiring the deployment and configuration information of each IoT gateway, the central gateway may compare the deployment and configuration information of the target gateway with the deployment and configuration information of each candidate gateway, so as to determine the difference between the deployment and configuration information of the target gateway and the deployment and configuration information of each candidate gateway. Then, at least one cooperative gateway is selected from the candidate gateways based on differences between the deployment and configuration information of candidate gateways and the deployment and configuration information of the target gateway.

In an example of this embodiment, the central gateway may select, for the target gateway, a candidate gateway with a maximum difference from the deployment and configuration information of the target gateway as the cooperative gateway. It should be understood that, when the difference between the deployment and configuration information of a candidate gateway and the deployment and configuration information of the target gateway is larger, it represents that the similarity between the two gateways is smaller, that is, the correlation between the two gateways in at least one of the physical location, the topological relationship, and the carried service is smaller. In this case, the probability that the two gateways are faulty and offline at the same time is lower, and therefore, if the candidate gateway is selected as a cooperative gateway of the target gateway and cooperation is established between the two gateways, a situation that the two gateways, which are mutually cooperative gateways, are not online at the same time basically does not occur, which helps improve the stability of the IoT network.

In the foregoing example, the central gateway selects a candidate gateway with a maximum difference from the deployment and configuration information of the target gateway as the cooperative gateway of the target gateway, but in fact, in some examples of this embodiment, the cooperative gateway selected by the central gateway is not necessarily required to be the one with the maximum difference from the deployment and configuration information of the target gateway, and may be a gateway for which the difference meets a certain requirement. In an example of this embodiment, the central gateway may calculate the similarity between the deployment and configuration information of each candidate gateway and the deployment and configuration information of the target gateway, and select, from the calculation result, a candidate gateway of which the similarity degree is lower than a preset threshold as the cooperative gateway of the target gateway.

In addition, in the foregoing example, one target gateway has only one cooperative gateway, but it should be understood that, in other examples of this embodiment, one target gateway may have more than one cooperative gateway. Furthermore, in some IoT networks, the numbers of cooperative gateways configured by the central gateway for different IoT gateways may be different. For example, some IoT gateways have two cooperative gateways, some IoT gateways have more than two cooperative gateways, and some IoT gateways may have only one cooperative gateway. It can be understood that the greater the number of cooperative gateways configured for a target gateway, the better stability the target gateway can have when performing cooperative data management with respective cooperative gateways of the target gateway, however, the resource occupancy rate of the management also increases with the number of the cooperative gateways. Therefore, in order to balance the resource occupancy rate and the stability of cooperative data management, in an example of this embodiment, the central gateway may configure at least one and at most two cooperative gateways for each gateway in the IoT network.

It can be understood that, when the central gateway selects at least one cooperative gateway for the target gateway, the candidate gateways include the central gateway. Therefore, the central gateway itself may also serve as a cooperative gateway of one or more IoT gateways. In addition, the central gateway itself may also serve as a target gateway, and the central gateway may select at least one cooperative gateway for itself.

In this embodiment, the central gateway may be selected by all the IoT gateways in the IoT network. Hence, in some examples, before the central gateway selects and configures at least one cooperative gateway for the target gateway, respective gateways in the IoT network also need to select the central gateway together. Before the central gateway is selected, any one of the IoT gateways in the IoT network may become the central gateway, and these IoT gateways need to participate in the central gateway election. Hence, for an IoT gateway that will subsequently be selected as the central gateway, this IoT gateway also needs to participate in the central gateway election together with other gateways in the IoT network.

In some examples of this embodiment, respective IoT gateways in the IoT network may select a central gateway according to a performance mean value. For an IoT gateway, the performance mean value of the IoT gateway may be determined according to at least two node status parameters of the gateway. The node status parameters include, but are not limited to, a storage capacity, an calculation speed, an average bandwidth, and an operation stability parameter. Hence, the performance mean value of the IoT gateway may be calculated and determined according to at least two of the foregoing node status parameters. The process of selecting the central gateway is introduced below.

For an IoT gateway in an IoT network, the gateway may acquire a first election message sent by a first neighboring gateway of the gateway, wherein the first election message carries identification information and a performance mean value of an IoT gateway with the maximum performance mean value known to the first neighboring gateway. After acquiring the first election message, the IoT may compare the performance mean value of the current gateway with the performance mean value carried in the first election message, generate a second election message according to the identification information and the performance mean value of a gateway with a larger mean value in the comparison result, and send the second election message to a second neighboring gateway of the current gateway. When the second neighboring gateway receives the second election message from the current gateway, the second neighboring gateway may execute a similar process as the current gateway. From the perspective of the second neighboring gateway of the current IoT gateway, the current IoT gateway is equivalent to the first neighboring gateway of the second neighboring gateway, and the second election message received by the second neighboring gateway may also be regarded as the first election message. By analogy, after several cycles, respective gateways in the IoT network can determine a gateway with the maximum performance mean value, and then this gateway is determined as the central gateway in the IoT network. In an example of this embodiment, the number of cycles may be set based on the number of hops between two most distant IoT gateways in the IoT network, so as to ensure that one IoT gateway with the maximum performance mean value can be elected within the range of the IoT network.

It can be understood that, if it is determined through comparison of the current IoT gateway that the performance mean value of the current IoT gateway is greater than the performance mean value carried in the first election message, the identification information and the performance mean value of the current IoT gateway are carried in the second election message. If the performance mean value carried in the first election message is greater than the performance mean value of the current IoT gateway, the identification information and the performance mean value that are carried in the second election message are consistent with the identification information and the performance mean value that are carried in the first election message. That is, if the IoT gateway finds through comparison that the performance mean value of the IoT gateway is not greater than the performance mean value carried in the first election message, the IoT gateway may send the received first election message to the second neighboring gateway of the gateway.

In operation S104, the central gateway notifies the target gateway of the at least one cooperative gateway of the target gateway.

After selecting the at least one cooperative gateway for the target gateway, the central gateway may notify the target gateway of the at least one selected cooperative gateway, so that the target gateway may establish cooperation with the at least one cooperative gateway of the target gateway and perform cooperative management. For example, the central gateway may carry information of the at least one cooperative gateway in cooperation configuration information and send the cooperation configuration information to the target gateway, thereby achieving the effect of notifying the target gateway of the at least one cooperative gateway. In an example of this embodiment, the central gateway may carry the identification information of the selected cooperative gateway in the cooperation configuration information and send the cooperation configuration information to the target gateway.

After receiving the cooperation configuration information from the central gateway, the target gateway may determine, according to the cooperation configuration information, the at least one cooperative gateway configured by the central gateway for the target gateway, then send a cooperation establishment request to the at least one cooperative gateway, requesting to establish cooperation with the at least one cooperative gateway. After the at least one cooperative gateway of the target gateway receives the cooperation establishment request, the at least one cooperative gateway may establish cooperation with the target gateway in response to the cooperation establishment request of the target gateway, thereby implementing cooperative management of data between the target gateway and the at least one cooperative gateway.

For any one of the IoT gateways in the IoT network, after receiving a cooperation establishment request sent by another IoT gateway, it represents that the IoT gateway has already been selected by the central gateway as a cooperative gateway of the gateway sending the cooperation establishment request. In this case, the IoT gateway can firstly determine whether the IoT gateway itself can serve as a cooperative gateway of the gateway sending the cooperation establishment request. For example, the IoT gateway firstly determines whether resources of the current IoT gateway meet a demand for cooperative data management of the gateway sending the cooperation establishment request, and if the determination result is positive, the IoT gateway allocates, in responsive to the cooperative establishment request of the gateway sending the cooperation establishment request, cooperation resources used for cooperative data management to the gateway sending the cooperation establishment. It can be understood that, in this embodiment, the cooperative data management is bidirectional, that is, one IoT gateway A is a cooperative gateway of another IoT gateway B, and the IoT gateway B is also a cooperative gateway of the IoT gateway A, so the IoT gateway A and the IoT gateway B are cooperative gateways of each other.

After the cooperative gateway responds to the cooperation establishment request of the target gateway, the target gateway and the at least one cooperative gateway of the target gateway may jointly perform cooperative data management. In this embodiment, the cooperative data management performed by the IoT gateways acting as the cooperative gateways for each other includes performing at least one of the following types of data management:

(1) Sending data collected by the current gateway in a first data backup period to the at least one cooperative gateway;

(2) Receiving and storing data which is collected by the at least one cooperative gateway in a second data backup period and sent by the at least one cooperative gateway;

(3) Receiving a backup data deletion instruction sent by at least one cooperative gateway of the current gateway, and deleting, according to the backup data deletion instruction, data which is collected by the at least one cooperative gateway in a third data backup period and is stored in the current gateway;

(4) Uploading, according to a backup data recovery instruction sent by an application server, data which is collected by the at least one cooperative gateway of the current gateway in a fourth data backup period and is stored in the current gateway; and (5) Uploading, after at least one cooperative gateway is offline, data of the at least one cooperative gateway stored in the current gateway to an application server.

The process of cooperative data management between the cooperative gateways is described below.

The data management (1) and (2) mentioned above relate to data backup management between cooperative gateways.

The data management (1) relates to a process that the current IoT gateway sends the data collected by the current IoT gateway to at least one cooperative gateway of the current IoT gateway. It can be understood that the process of sending, by the IoT gateway, the data collected by the IoT gateway to the at least one cooperative gateway of the IoT gateway is usually performed periodically, and the first data backup period is the period according to which the IoT gateway sends data to the at least one cooperative gateway of the IoT gateway. It can be understood that in the first data backup period, the data that the IoT gateway sends to the at least one cooperative gateway of the IoT gateway is the data that is collected by the IoT gateway in the first data backup period. The data management (2) relates to a process that the IoT gateway receives data sent by the at least one cooperative gateway of the IoT gateway and performs backup management. Similarly, the at least one cooperative gateway sends data to the IoT gateway periodically, and the second data backup period is the period according to which the at least one cooperative gateway of the IoT gateway sends data to the IoT gateway. The data sent by the at least one cooperative gateway to the IoT gateway during the second data backup period is also the data collected by the at least one cooperative gateway during the second data backup period.

In some examples of this embodiment, data collected by the target gateway and the at least one cooperative gateway of the target gateway may be backed up and stored, or even simply processed. In an example of the embodiment, a first IoT gateway and a second IoT gateway are cooperative gateways of each other, and the first IoT gateway may send data collected within the first data backup period by the first gateway to the second IoT gateway for storage. In addition, the second IoT gateway also sends the data collected in the second data backup period to the first IoT gateway for backup storage. In some examples of this embodiment, the first data backup period may be equal to the second data backup period, that is, the first IoT gateway and the second IoT gateway send the data collected by the current gateway in the latest data backup period to each other at the same time interval. For example, assuming that the data backup period is 1 hour, the first IoT gateway sends to the second IoT gateway data collected by the first IoT gateway within the last 1 hour according to the period duration of 1 hour, and likewise, the second IoT gateway sends to the first IoT gateway data collected by the second IoT gateway within the last 1 hour according to the period duration of 1 hour.

The cooperative data management process involved in the data management (3) is introduced below.

Generally, when one IoT gateway periodically sends data to its own cooperative gateway so that the cooperative gateway backs up the data collected by the IoT gateway, the data collected by the IoT gateway is also uploaded to the application server. For example, after the IoT gateway sends the data collected by the IoT gateway in the third data backup period to its own cooperative gateway, the IoT gateway also uploads this part of the data to the application server. After determining that the data collected in the third data backup period has been successfully uploaded to the application server, the IoT gateway may send a "backup data deletion instruction" to its own cooperative gateway, and this "backup data deletion instruction" is used to instruct the cooperative gateway to delete the data which is collected by the IoT gateway in the third data backup period and is backed up and stored by the cooperative gateway. Hence, after the cooperative gateway receives the backup data deletion instruction from the IoT gateway, the cooperative gateway deletes, according to the backup data deletion instruction, the data which is collected by the IoT gateway in the third data backup period and is locally stored in the cooperative gateway.

The cooperative data management process involved in the data management (4) is introduced below.

It can be seen from the above description that, in general, an IoT gateway not only sends data collected by the IoT gateway in a data backup period to its own cooperative gateway, so that the cooperative gateway backs up the data, but also uploads the data collected in the data backup period to an application server. However, in some cases of this embodiment, the cooperative gateway of the IoT gateway receives and acquires data collected by the IoT gateway in a certain data backup period, but the application server cannot acquire the data collected by the IoT gateway in the data backup period. For example, assuming that after the IoT gateway sends data collected by the IoT gateway in a fourth data backup period to its own cooperative gateway, the IoT gateway becomes failed or offline, the IoT gateway has not been able to successfully upload the data collected within the fourth data backup period to the application server, in such a case, the application server may need to acquire the data which is collected by the IoT gateway within the fourth data backup period from the cooperative gateway of the IoT gateway. Hence, the application server may send a "backup data recovery indication" to the cooperative gateway of the IoT gateway, to instruct the cooperative gateway of the IoT gateway to upload the data collected by the IoT gateway within the fourth data backup period. Hence, from the perspective of the cooperative gateway of the IoT gateway, this cooperative gateway uploads the stored data collected by the cooperative gateway of the current gateway in the fourth data backup period according to the backup data recovery instruction sent by the application server.

In some examples of this embodiment, after a certain IoT gateway determines that a certain cooperative gateway of the IoT gateway is offline, the data of the cooperative gateway stored in the current gateway may also be sent to the application server. It can be understood that, when an IoT gateway is not offline yet, the data collected by the IoT gateway is generally sent periodically to the application server, and the data sending period may be the same as or different from a period in which the IoT gateway sends data to the cooperative gateway. Hence, after the IoT gateway is offline, when the cooperative gateway of the IoT gateway uploads data of the IoT gateway stored in the cooperative gateway to the application server, it is not necessary to upload all the data, but only the data designated by the application server. For example, assuming that gateways A and B are cooperative gateways, and when gateway B detects that gateway A is offline, the data of gateway A stored in gateway B may be uploaded to the application server. In some examples, gateway B may only send data specified by the application server to the application server. For example, after the gateway B determines that gateway A is offline, the start time and the end time of the locally stored data of gateway A is sent to the application server. The application server specifies a time period from the start time and the end time, and then gateway B sends the data in the time period specified by the application server to the application server.

In some examples of this embodiment, the IoT gateway in the IoT network only performs a part of the foregoing three flows. In more examples of this embodiment, the IoT gateway simultaneously performs the foregoing three flows.

In addition to cooperative data management, two IoT gateways, which are cooperative gateways of each other, also need to manage the cooperation relationship of each other. In some examples of this embodiment, after cooperation is established between at least two IoT gateways, the cooperation relationship may also be removed according to requirements of the IoT gateways. For example, assuming that two IoT gateways, B and D, are cooperative gateways of each other, when gateway B needs to release the cooperation relationship with gateway D, gateway B may send a cooperation removal request to the central gateway, requesting the central gateway to remove the cooperation relationship between gateway B and gateway D, and re-configure a new cooperative gateway for gateway B or gateway D when needed by gateway B or gateway D. It can be understood that after gateways B and D remove the cooperation relationship between each other, gateways B and D do not perform cooperative data management any more. Gateway B may release cooperation resources that it allocates to gateway D, and Gateway D may also delete cooperation resources that it allocates to gateway B. Hence, when managing the cooperation relationship, the cooperation relationship with the corresponding cooperative gateway may be actively removed, or the cooperation relationship between the current gateway and the cooperative gateway may be removed when requested by the cooperative gateway.

In this embodiment, two or more gateways which are the cooperative gateways of each other may also monitor the live status of the cooperative gateway, and report the live status to the central gateway when determining that a cooperative gateway is offline.

For a certain IoT gateway, if it is detected that a certain cooperative gateway of the IoT gateway is in an offline state, a message that the cooperative gateway has been offline may be reported to the central gateway, so that the central gateway manages data of the cooperative gateway and performs corresponding system management. For example, because the cooperative gateway is offline, one or more gateways that originally established cooperation with the cooperative gateway do not have a cooperative gateway any more, the central gateway needs to reconfigure the cooperative gateway for the IoT gateways that do not have a cooperative gateway.

According to the method for implementing the gateway cooperation provided in this embodiment, various gateway in an IoT network first automatically elect a central gateway in the current IoT network, and then the central gateway allocates at least one cooperative gateway to each gateway in the IoT network, thereby addressing the problems of poor flexibility and poor extensibility of the gateway cooperation scheme caused by configuring the cooperative gateway by network management personnel. In addition, the central gateway is also elected and determined by the gateways in the IoT network, and the selection of the central gateway is not based on a single node status parameter but based on a performance mean value of at least two node status parameters; therefore, the selected central gateway has a stronger comprehensive capability, and is more stable when gateway cooperation is implemented.

Still further, in this embodiment, before establishing the cooperation between the IoT gateways, the resource demand for performing cooperative data management is considered, which is more reasonable.

Embodiment 2

With the increasing popularity of IoT applications, some delay-sensitive services have begun to emerge (e.g., intelligent industrial control). A Mobile Edge Computing (MEC) system provides conditions for supporting such IoT services. By deploying an IoT gateway in a software-based manner in a MEC system, the processing capability of an edge server can be used to support multiple different IoT protocols under the condition of guaranteeing a low time delay, and more functions can be provided to enhance the manageability of an IoT network, thereby simplifying the deployment and improving the service flexibility.

Figure 3:
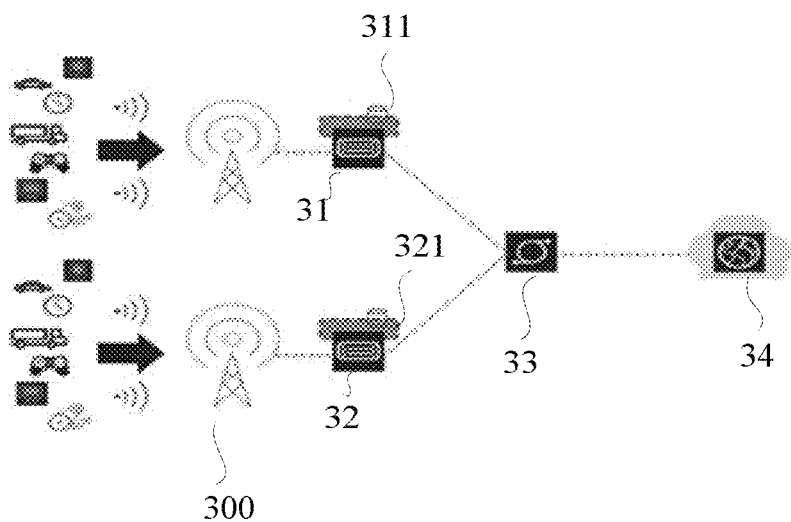
FIG. 3 is a schematic diagram of the architecture of an IoT network according to Embodiment 2 of the present disclosure.

In an example of this embodiment, an IoT gateway may be deployed in a MEC server sharing a uniform site address with a base station. Referring to FIG. 3, a first IoT gateway 311 is deployed in a first MEC server 31, and a second IoT gateway 321 is deployed in a second MEC server 32. An IoT device communicates with an IoT gateway on the MGC server through the base station 300, and the IoT gateway collects data of the IoT device. In addition, the two MEC servers are in communication connection with the core network 33, and are connected to the Internet 34 through the core network 33. This deployment mode can effectively reduce the round trip delay of service delivery. Furthermore, due to the relatively powerful processing capability of the MEC server, calculation intensive functions such as big data analysis can be additionally supported.

Figure 4:
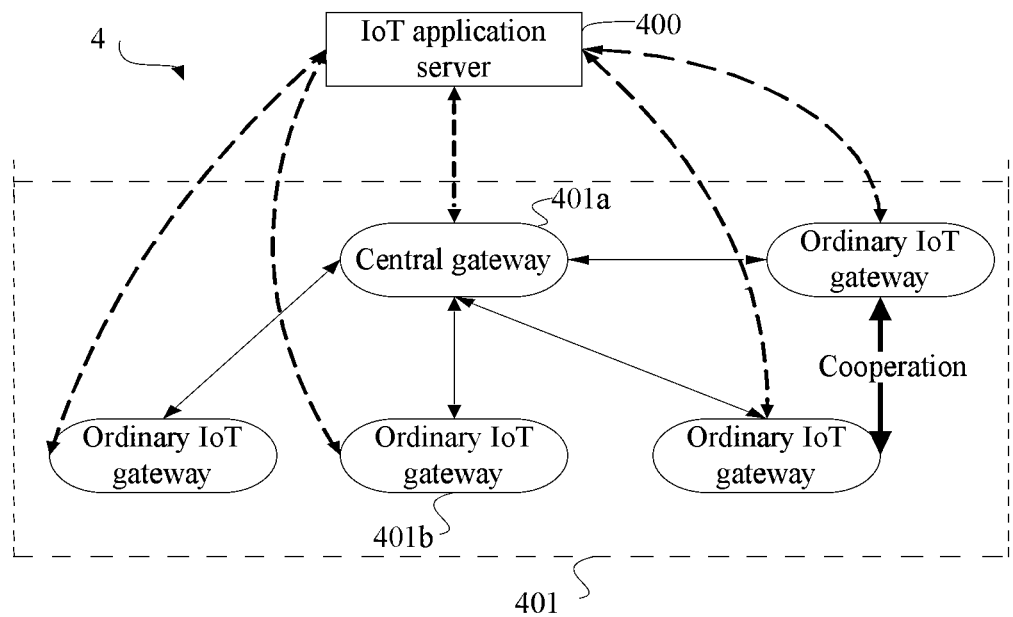
FIG. 4 is a schematic diagram of a system for implementing gateway cooperation according to Embodiment 2 of the present disclosure.

A system for implementing gateway cooperation is described as follows with reference to FIG. 4.

The system 4 for implementing the gateway cooperation includes an IoT application server 400 and multiple IoT gateways 401 in communication connection with the IoT application server 400. The multiple IoT gateways 401 include a central gateway 401a and ordinary IoT gateways 401b except the central gateway 401a. The multiple ordinary IoT gateways 401b are all in communication connection with the central gateway 401a. The central gateway 401a can manage a cooperation relationship between IoT gateways 401 in the system 4 for implementing the gateway cooperation. For example, the central gateway 401a can select at least one cooperative gateway for a certain IoT gateway 401 in the system 4 for implementing the gateway cooperation, so that the IoT gateway 401 and the at least one cooperative gateway of the IoT gateway 401 establish cooperation, and backup and process data of each other. In addition, since multiple IoT gateways 401 are all in communication connection with the IoT application server, the IoT gateways 401 in the system 4 for implementing the gateway cooperation can report collected data to the IoT application server 400.

In the system 4 for implementing the gateway cooperation, the central gateway 401a is actually selected from the IoT gateways 401. Before the central gateway 401a is elected as a central gateway, all IoT gateways 401 in the system 4 for implementing the gateway cooperation are the same.

The method for implementing the gateway cooperation is further described below in combination with FIG. 4, so that those having ordinary skill in the art can more clearly understand the advantages and details of the method for implementing the cooperative gateway.

Figure 5:
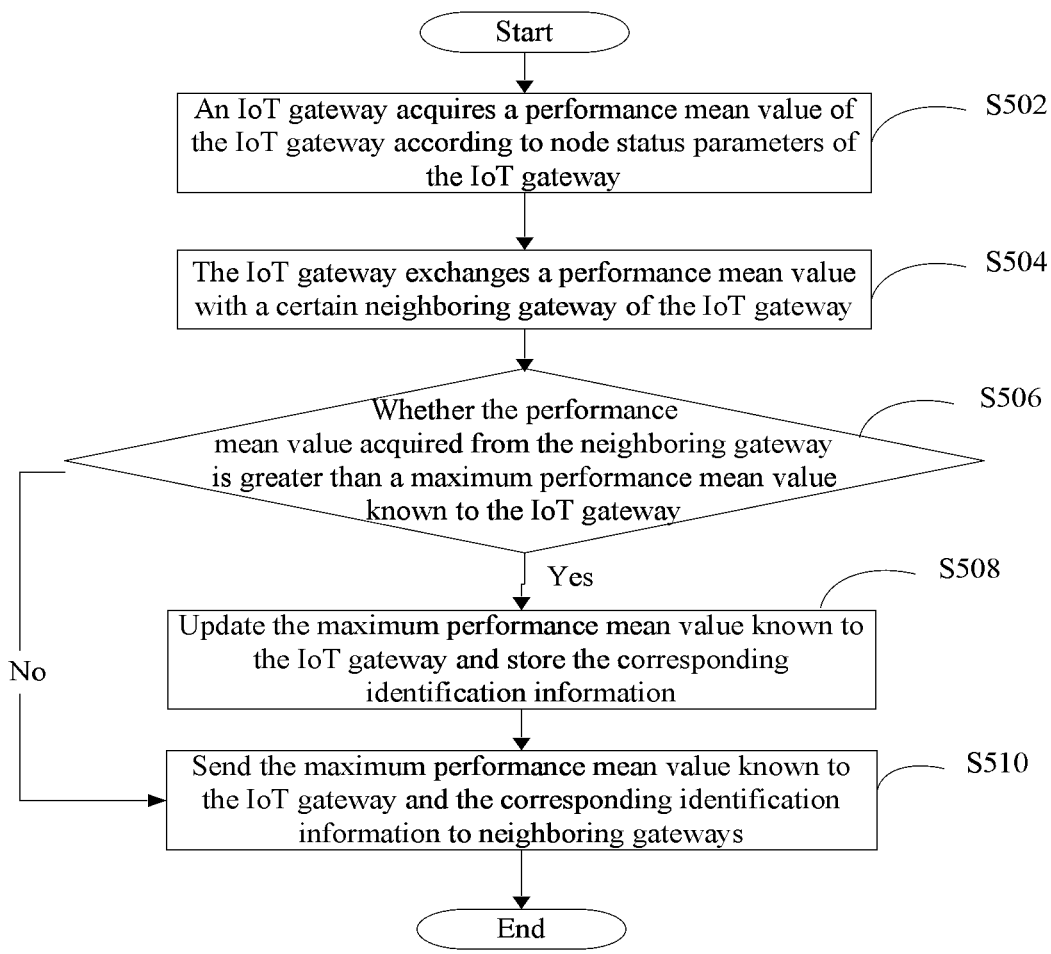
FIG. 5 is a flowchart of selecting a central gateway in the method for implementing the gateway cooperation according to Embodiment 2 of the present disclosure.

First, taking an IoT gateway as an example, the flow is introduced below with reference to the flowchart of selecting the central gateway in the method for implementing the gateway cooperation shown in FIG. 5.

In operation S502, the IoT gateway acquires a performance mean value of the IoT gateway according to node status parameters of the IoT gateway.

The node status parameters herein include storage capacity, calculation speed, average bandwidth, and operation stability parameter. Any IoT gateway can calculate a performance mean value of itself according to a preset relationship. The preset relationship includes, but is not limited to, a preset formula including a preset weight coefficient of each node status parameter. Alternatively, the preset relationship may include a preset weight coefficient of each node status parameter. In an example of this embodiment, the performance mean value=(a*storage capacity+b*calculation speed+c*average bandwidth+d*operation stability parameter)/(a+b+c+d). After an IoT gateway acquires four types of node status parameters of the IoT gateway, an IoT gateway can calculate the performance mean value according to the above formula.

It can be understood that the performance mean value cannot be represented by a single node status parameter. In the foregoing example, the performance mean value is decided by four node status parameters, i.e., storage capacity, calculation speed, average bandwidth, and operation stability parameter. Therefore, when the central gateway is selected according to the performance mean value of the IoT gateway, the capabilities of the foregoing four aspects of the IoT gateway can be considered synthetically, so as to ensure that the selected central gateway has more comprehensive and more stable and effective capabilities.

In operation S504, the IoT gateway exchanges a performance mean value with a certain neighboring gateway of the IoT gateway.

It can be understood that, for a certain IoT gateway, when exchanging a performance mean value with a certain neighboring gateway, the IoT gateway first sends the performance mean value and the identification information of the IoT gateway itself to the neighboring gateway, but in a subsequent process, the IoT gateway may send the performance mean value and the identification information of another gateway to the neighboring gateway. In fact, in each exchange process, the IoT gateway sends the maximum performance mean currently known to the IoT gateway and the corresponding identification information to the neighboring gateway, but at the beginning, the maximum performance mean value known to the IoT gateway is the performance mean value of the IoT gateway itself.

In operation S506, the IoT gateway determines whether the performance mean value acquired from the neighboring gateway is greater than a maximum performance mean value known to the IoT gateway.

If a result of the determination is positive, operation S508 is performed; otherwise, operation S510 is directly performed.

In operation S508, the IoT gateway updates the maximum performance mean value known to the IoT gateway and stores the corresponding identification information.

It can be understood that, if the IoT gateway determines that the performance mean value acquired by the IoT gateway from the neighboring gateway is greater than the maximum performance mean value known to the IoT gateway, the IoT gateway needs to update the maximum performance mean value known to the IoT gateway. For example, the maximum performance mean value originally known to the IoT gateway is the performance mean value of the IoT gateway of which identification information is "5", and the performance mean value of this IoT gateway of which identification information is "5" is 89. Through a certain exchange, the maximum performance mean value acquired by the IoT gateway from the neighboring gateway is 93, which belongs to the IoT gateway with the identification information of "17". In this case, the IoT gateway needs to update the maximum performance mean value known to the IoT gateway from 89 to 93, and at the same time, store identification information of the IoT gateway corresponding to the maximum performance mean value, that is, "17".

In operation S510, the IoT gateway sends the maximum performance mean value known to the IoT gateway and the corresponding identification information to all neighboring gateways.

It can be understood that, in order to enable other IoT gateways to know the maximum performance mean value and the gateway identification information known to the IoT gateway as soon as possible, after the IoT gateway exchanges the maximum performance mean value with a certain neighboring gateway, the IoT gateway may send the maximum performance mean value currently known to the IoT gateway and the identification information of the corresponding IoT gateway to all the neighboring gateways of the IoT gateway, especially after the maximum performance mean value known to the IoT gateway has been updated.

In this embodiment, after the central gateway is selected, the central gateway may also select a backup central gateway among other gateways in the IoT network, and the backup central gateway is used for operating in place of the central gateway after central gateway switching.

When central gateway switching needs to be performed, an original central gateway determines that a change value of the performance mean value of the backup central gateway after becoming the backup central gateway is within a preset range, then transfers data of the current gateway to the backup central gateway, and notifies other gateways in the IoT network that the backup central gateway becomes a new central gateway. For example, during the central gateway switching, the original central gateway needs to confirm the validity of the current backup central IoT gateway in the IoT network, i.e., determine whether the variation degree of the weighted mean value of the current backup central IoT gateway is within a preset range. When it is determined that the current backup central gateway is valid, the current central IoT gateway of the IoT network transfers local relevant data to the current backup central IoT gateway via a secure channel, and after data transfer is completed, sends a central gateway switching notification to the other IoT gateways in the network so as to instruct that the current central IoT gateway in the IoT network changes to the current backup central IoT gateway. When it is determined that the current backup central IoT gateway is invalid, the central IoT gateway of the IoT network is re-determined.

Figure 6:
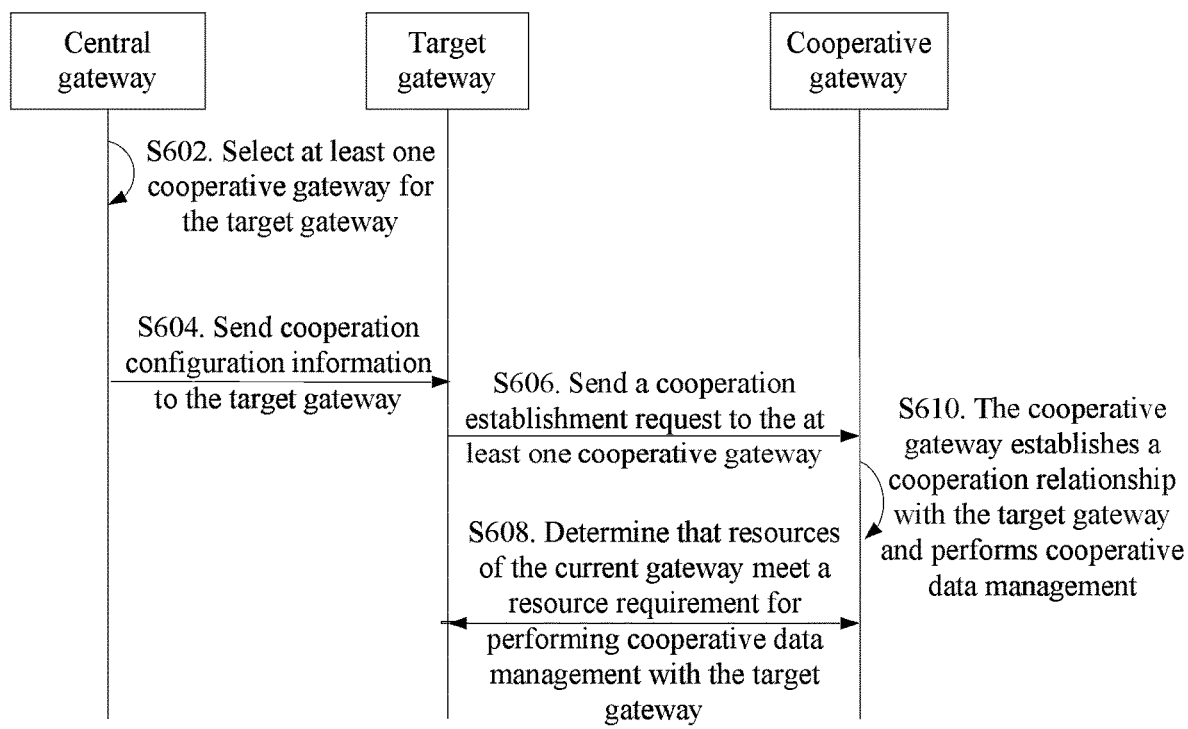
FIG. 6 is a flowchart of establishing a data cooperation relationship in the method for implementing the gateway cooperation according to Embodiment 2 of the present disclosure.

The process of establishing the data cooperation relationship in the method for implementing the gateway cooperation will be introduced below with reference to FIG. 6.

In operation S602, a central gateway selects at least one cooperative gateway for a target gateway based on a difference between the target gateway and each gateway in the IoT network.

In the foregoing embodiment, it is proposed that the central gateway selects at least one cooperative gateway for the target gateway based on the similarity between the deployment and configuration information of the target gateway and the deployment and configuration information of each candidate gateway in the IoT network. In this embodiment, another solution is provided below.

The central gateway configures encoding information for each IoT gateway in the IoT network. Usually, the encoding information may be determined based on the deployment and configuration information of each IoT gateway. When the target gateway needs to be allocated with at least one cooperative gateway, the central gateway acquires encoding information of the target gateway, and selects at least one cooperative gateway satisfying a preset requirement for the target gateway from multiple candidate gateways in the IoT network based on the encoding information of the target gateway. For example, the central gateway acquires encoding information representing the location information of the target gateway and multiple pieces of encoding information representing location information of multiple other IoT gateways in the IoT network, and compares, starting from high bits, the encoding information of the target gateway with the respective bits of the multiple pieces of encoding information of the multiple other gateways, to search, from the multiple pieces of encoding information, for target encoding information with the largest number of consecutive encoding bits (starting from high bits) not overlapping with the encoding information of the target gateway, and determine the gateway corresponding to the target encoding information as a cooperative gateway of the target gateway.

In operation S604, the central gateway sends cooperation configuration information to the target gateway.

After determining the at least one cooperative gateway for the target gateway, the central gateway may send the cooperation configuration information to the target gateway. The cooperation configuration information may indicate information of the at least one cooperative gateway to the target gateway. In an example of this embodiment, the cooperation configuration information includes identification information of the at least one cooperation gateway.

In operation S606, the target gateway sends a cooperation establishment request to the at least one cooperative gateway.

After receiving the cooperation configuration information sent by the central gateway, the target gateway sends a cooperation establishment request to the at least one cooperative gateway selected by the central gateway.

In operation S608, the cooperative gateway determines that resources of the current gateway meet a resource requirement for performing cooperative data management with the target gateway.

After receiving the cooperation establishment request from the target gateway, the at least one cooperative gateway may verify and authenticate the target gateway, and determine whether local resources satisfy service requirements of the target gateway, that is, determine whether the local resources satisfy the resource requirements for performing cooperative data management with the target gateway.

In operation S610, the at least one cooperative gateway establishes cooperation with the target gateway and performs cooperative data management.

If the local resources satisfy the service requirements of the target gateway, the cooperative gateway feeds back a request acceptance response message. After receiving the request acceptance response message, the target gateway waits for the cooperative gateway to complete cooperation resource allocation. After accomplishing the cooperation resource allocation for the target gateway, the cooperative gateway sends a cooperation establishment confirmation message to the target gateway, so as to establish cooperation with the target gateway and perform cooperative data management.

If the local resources do not satisfy the service requirements of the target gateway, the cooperative gateway feeds back a request rejection response message. After receiving the f request rejection response message, the target gateway sends a cooperative gateway reselection request to the central gateway, and the process proceeds to S602.

When performing cooperative data management, the target gateway may send data information to the cooperative gateway according to a preset period T1. The data information includes all data generated within a time period from the time when the target gateway previously sends data information to the cooperative gateway to the current time. After verifying the correctness of the backup data, the cooperative gateway sends a data information reception acknowledgement message to the target gateway.

On the other hand, the target gateway also uploads original data information to the IoT application server according to a preset period T2. After verifying the correctness of the original data, the IoT application server sends an original data reception acknowledgement message to the target gateway.

In this embodiment, the cooperative gateway and the target gateway may determine whether the peer gateway is still online according to the live information sent by the peer gateway. The cooperative gateway receives the live information sent by the target gateway, and monitors a live status of the target gateway according to the received live information. When determining that the current state of the target gateway is offline according to the live state, the cooperative gateway sends a notification message for indicating that the target gateway has been offline to the central gateway. After receiving the notification message, the central gateway attempts to communicate with the target gateway, and when the communication attempt is unsuccessful, determines that the current state of the target gateway is offline. The central gateway adjusts the cooperation relationship of the managed IoT gateways according to the current topology states of the target gateway and the cooperative gateway, i.e., if the cooperative gateway has other alive (online) cooperative gateways, the cooperation relationship of the managed gateway is maintained; if there is no other alive (online) cooperative gateways in the cooperative gateways, another cooperative gateway or other cooperative gateways is/are re-allocated to the managed gateway.

After determining that the target gateway is offline, the cooperative gateway may further send a data information recovery request message to the IoT application server. The data information recovery request message includes the start time and the end time of the local storage of the target gateway in the cooperative gateway. After receiving a data information recovery acceptance message fed back by the IoT application server, the cooperative gateway sends locally stored data information to the IoT application server. The data information recovery acceptance message contains a start time and an end time of data information of the target gateway that the IoT application server wants to recover. After determining the correctness of the received data information, the IoT application server feeds back a data information acknowledge message.

In addition, after the target gateway establishes cooperation with the at least one cooperative gateway, the target gateway and the at least one cooperative gateway may actively request to remove the cooperation relationship. For example, the target gateway may send a connection removal request to the at least one cooperative gateway; and the at least one cooperative gateway releases the cooperation resources allocated to the IoT gateway after verifying and authenticating the target gateway, and sends a connection release acknowledgement message to the IoT gateway.

The method and system for implementing the gateway cooperation provided in the embodiments of the present disclosure can further improve the processing capability of the IoT gateways, and can satisfy the further requirements of applications on IoT edge gateways. In addition, because the cooperative gateway of the target gateway is selected by the central gateway, the cooperation relationship between the IoT gateways does not need to be configured by network management personnel, which avoids the stiffening problem caused by artificially configuring the cooperation relationship, and improves the flexibility and expandability of the solution for implementing the gateway cooperation.

Embodiment 3

Figure 7:
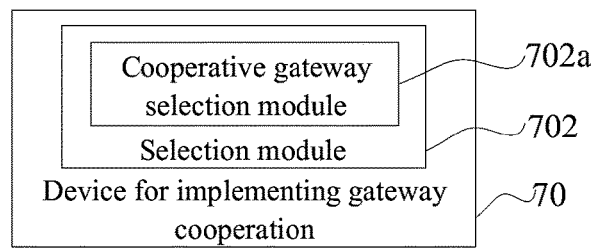
FIG. 7 is a schematic diagram of a first structure of a device for implementing gateway cooperation according to Embodiment 3 of the present disclosure.

This embodiment provides a device for implementing gateway cooperation. With reference to FIG. 7, the device 70 for implementing the gateway cooperation includes a selection module 702, and the selection module 702 may further include a cooperative gateway selection module 702a. The cooperative gateway selection module 702a is configured to select at least one cooperative gateway for a target gateway from gateways in an IoT network, and notify the target gateway of the at least one cooperative gateway.

It can be understood that the device 70 for implementing the gateway cooperation may be deployed in an IoT gateway. The function of the selection module 702 may be implemented by a processor and a communication device of the IoT gateway. For example, the process that the cooperative gateway selection module 702a selects at least one cooperative gateway for the target gateway may be implemented by the processor of the IoT gateway, and the process of notifying the target gateway of the at least one cooperative gateway may be implemented by controlling the communication device by the processor of the IoT gateway.

In this embodiment, the cooperation relationship of the gateways in the IoT network is configured by the device 70 for implementing the gateway cooperation, that is, the cooperative gateway of each gateway is selected and configured by the device 70 for implementing the gateway cooperation. The process that the device 70 for implementing the gateway cooperation selects, from the gateways in the IoT network, at least one cooperative gateway for the target gateway to which at least one cooperative gateway needs to be configured will be described below.

First, the cooperative gateway selection module 702a of the device 70 for implementing the gateway cooperation acquires deployment and configuration information of gateways in the IoT network. The deployment and configuration information of the IoT gateway includes at least one of a physical location where the IoT gateway is deployed, a network topology relationship, and network services carried by the IoT gateway. It can be understood that the "gateways in the IoT network" also include the device 70 for implementing the gateway cooperation itself in addition to other ordinary gateways. Therefore, when acquiring the deployment and configuration information of the gateways in the IoT network, the cooperative gateway selection module 702a also acquires the deployment and configuration information of the device 70 for implementing the gateway cooperation.

Then, the cooperative gateway selection module 702a selects at least one cooperative gateway for the target gateway according to differences between the deployment and configuration information of candidate gateways and the deployment and configuration information of the target gateway.

For a target gateway to which at least one cooperative gateway needs to be configured, at least one cooperative gateway of the target gateway is selected by the cooperative gateway selection module 702a from other gateways except the target gateway itself. Therefore, for the target gateway, candidate gateways of the cooperative gateway are other gateways except the target gateway in the IoT network. For ease of description, gateways except the target gateway in the IoT network are referred to as candidate gateways of the target gateway in the subsequent description. After acquiring the deployment and configuration information of the IoT gateways, the cooperative gateway selection module 702a may compare the deployment and configuration information of the target gateway with the deployment and configuration information of each candidate gateway to determine a difference between the deployment and configuration information of the target gateway and the deployment and configuration information of each candidate gateway. Then, at least one cooperative gateway is selected from the candidate gateways based on differences between the deployment and configuration information of candidate gateways and the deployment and configuration information of the target gateway.

In an example of this embodiment, the cooperative gateway selection module 702a may select, for the target gateway, a candidate gateway with a maximum difference from the deployment and configuration information of the target gateway as the cooperative gateway. It should be understood that, when the difference between the deployment and configuration information of the candidate gateway and the deployment and configuration information of the target gateway is larger, it represents that the similarity between the two gateways is smaller, that is, the correlation between the two gateways in at least one of the physical location, the topological relationship, and the carried services is smaller. In this case, the probability that the two gateways are faulty and offline at the same time is lower, and therefore, if the candidate gateway is selected as a cooperative gateway of the target gateway and cooperation is established between the two gateways, a situation that the two gateways, which are mutually cooperative gateways, are not online at the same time basically does not occur, which helps improve the stability of the IoT network.

In the foregoing example, the cooperative gateway selection module 702a selects a candidate gateway with a maximum difference from the deployment and configuration information of the target gateway as a cooperative gateway of the target gateway, but in fact, in some examples of this embodiment, the cooperative gateway selected by the cooperative gateway selection module 702a is not necessarily required to be the one with the maximum difference from the deployment and configuration information of the target gateway, and may be a gateway for which the difference meets a certain requirement. In an example of this embodiment, the cooperative gateway selection module 702a may calculate the similarity between the deployment and configuration information of each candidate gateway and the deployment and configuration information of the target gateway, and select, from the calculation result, a candidate gateway of which the similarity degree is lower than a preset threshold as the cooperative gateway of the target gateway.

In addition, in the foregoing example, one target gateway has only one cooperative gateway, but it should be understood that, in other examples of this embodiment, one target gateway may have more than one cooperative gateway. Furthermore, in some IoT networks, the numbers of cooperative gateways configured by the cooperative gateway selection module 702a for different IoT gateways may be different. For example, some IoT gateways may have two cooperative gateways, some IoT gateways have more than two cooperative gateways, and some IoT gateways may have only one cooperative gateway. It can be understood that the greater the number of cooperative gateways configured for a target gateway, the better stability the target gateway can have when performing cooperative data management with respective cooperative gateways of the target gateway, however, the resource occupancy rate of the management also increases with the number of the cooperative gateways. Therefore, in order to balance the resource occupancy rate and the stability of cooperative data management, in an example of this embodiment, the cooperative gateway selection module 702a may configure at least one and at most two cooperative gateways for each gateway in the IoT network.

It can be understood that, when the cooperative gateway selection module 702a selects at least one cooperative gateway for the target gateway, the candidate gateways include the device 70 for implementing the gateway cooperation. Therefore, the device 70 for implementing the gateway cooperation itself may also serve as a cooperative gateway of one or more IoT gateways. In addition, the device 70 for implementing the gateway cooperation itself may also serve as a target gateway, and the cooperative gateway selection module 702a may select at least one cooperative gateway for the device 70 for implementing the gateway cooperation.

Figure 8:
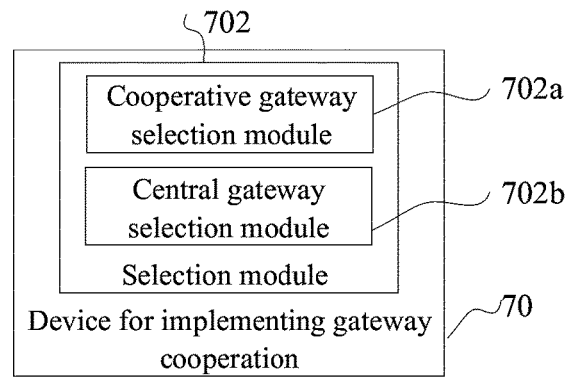
FIG. 8 is a schematic diagram of a second structure of a device for implementing gateway cooperation according to Embodiment 3 of the present disclosure.

In this embodiment, the device 70 for implementing the gateway cooperation is generally deployed in a central gateway, and the central gateway may be selected by all the IoT gateways in the IoT network. Hence, in some examples, as shown in FIG. 8, the selection module 702 may further include a central gateway selection module 702b. The central gateway selection module 702b is configured to select a central gateway together with each gateway in the IoT network. Before the central gateway is selected, any one of the IoT gateways in the IoT network may become the central gateway, and these IoT gateways need to participate in the central gateway election. Hence, for an IoT gateway that will subsequently be selected as the central gateway, this IoT gateway also needs to participate in the central gateway election together with other gateways in the IoT network.

In some examples of this embodiment, the central gateway selection module 702b may select a central gateway according to a performance mean value. For an IoT gateway, the performance mean value of the central gateway may be determined according to at least two node status parameters of the gateway. The node status parameters include, but are not limited to, a storage capacity, an calculation speed, an average bandwidth, and an operation stability parameter. Hence, the performance mean value of the IoT gateway may be calculated and determined according to at least two of the foregoing node status parameters. The process of selecting the central gateway is introduced below.

For an IoT gateway in an IoT network, a central gateway selection module 702b deployed thereon may exchange, with a first neighboring gateway of the IoT gateway, identification information and a performance mean value of a gateway with the maximum performance mean value known to each other. After acquiring the gateway with the maximum performance mean value from the first neighboring gateway, the IoT gateway compares the performance mean value acquired from the first neighboring gateway with the maximum performance mean value known to the current gateway, then, the IoT gateway continues exchanging the identification information and the performance mean value of the gateway with the maximum performance mean value with a second neighboring gateway of the current gateway. The second neighboring gateway continues to conduct exchange with other gateways to elect a gateway with the maximum performance mean value in the IoT network as the central gateway in the IoT network.

For example, the IoT gateway may acquire a first election message sent by a first neighboring gateway of the gateway, wherein the first election message carries identification information and a performance mean value of an IoT gateway with the maximum performance mean value known to the first neighboring gateway. After acquiring the first election message, the central gateway selection module 702b may compare the performance mean value of the current gateway with the performance mean value carried in the first election message, generate a second election message according to identification information and the performance mean value of a gateway with a larger performance mean value in the comparison result, and send the second election message to a second neighboring gateway of the current gateway. When the second neighboring gateway receives the second election message from the current gateway, the second neighboring gateway may execute a similar process as the current gateway. From the perspective of the second neighboring gateway of the current IoT gateway, the current IoT gateway is equivalent to the first neighboring gateway of the second neighboring gateway, and the second election message received by the second neighboring gateway may also be regarded as the first election message. By analogy, after several cycles, respective gateways in the IoT network can determine a gateway with the maximum performance mean value, and then this gateway is determined as the central gateway in the IoT network. In an example of this embodiment, the number of cycles may be set based on the number of hops between two most distant IoT gateways in the IoT network, so as to ensure that one IoT gateway with the maximum performance mean value can be elected within the range of the IoT network.

It can be understood that, if it is determined through comparison of the central gateway selection module 702b that the performance mean value of the current IoT gateway is greater than the performance mean value carried in the first election message, the identification information and the performance mean value of the current IoT gateway are carried in the second election message. If the performance mean value carried in the first election message is greater than the performance mean value of the current IoT gateway, the identification information and the performance mean value that are carried in the second election message are consistent with the identification information and the performance mean value that are carried in the first election message. That is, if the central gateway selection module 702b finds through comparison that the performance mean value of the current gateway is not greater than the performance mean value carried in the first election message, the IoT gateway may send the received first election message to the second neighboring gateway of the current gateway.

In some examples of this embodiment, the selection module 702 further includes a backup gateway selection module. The backup gateway selection module is configured to select, after the current gateway is selected as a central gateway, a backup central gateway from gateways in the IoT network except the current gateway, wherein the backup central gateway is used for operating in place of the central gateway after central gateway switching to become a new central gateway in the IoT network.

In some examples of this embodiment, the device 70 for implementing the gateway cooperation may further include a central gateway switching module configured to determine, during the central gateway switching, that a change value of the performance mean value of the backup central gateway after the backup central gateway becomes the backup central gateway is within a preset range, transfer data of the current gateway to the backup central gateway, and notify other gateways in the IoT network that the backup central gateway becomes a new central gateway.

When central gateway switching needs to be performed, the central gateway switching module determines that a change value of the performance mean value of the backup central gateway after becoming the backup central gateway is within a preset range, then transfers data of the current gateway to the backup central gateway, and notifies other gateways in the IoT network that the backup central gateway becomes a new central gateway. For example, during the central gateway switching, the central gateway switching module on the original central gateway needs to confirm the validity of the current backup central IoT gateway in the IoT network, i.e., determine whether the variation degree of the weighted mean value of the current backup central IoT gateway is within a preset range. When it is determined that the current backup central gateway is valid, the central gateway switching module transfers local relevant data to the current backup central IoT gateway via a security channel, and after data transfer is completed, sends a central gateway switching notification to other IoT gateways in the IoT network so as to instruct the current central IoT gateway in the IoT network to switch to be the current backup central IoT gateway. When it is determined that the current backup central IoT gateway is invalid, the central gateway selection module 702b re-determines the central IoT gateway of the IoT network.

After selecting the at least one cooperative gateway for the target gateway, the cooperative gateway selection module 702a may send information of the at least one cooperative gateway to the target gateway, thereby achieving the effect of notifying the target gateway of the at least one cooperative gateway. In an example of this embodiment, the cooperative gateway selection module 702a may carry the identification information of the selected cooperative gateway in cooperation configuration information, and send the cooperation configuration information to the target gateway.

Figure 9:
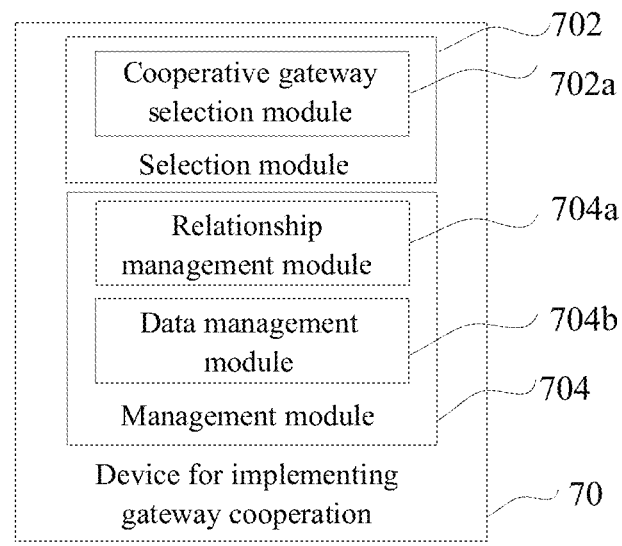
FIG. 9 is a schematic diagram of a third structure of a device for implementing gateway cooperation according to Embodiment 3 of the present disclosure.

In other examples of this embodiment, the device 70 for implementing the gateway cooperation may further include a management module. As shown in FIG. 9, the management module 704 includes a relationship management module 704a and a data management module 704b. The relationship management module 704a may establish cooperation with the at least one cooperative gateway of the IoT gateway where the device 70 for implementing the gateway cooperation is deployed, and manage the cooperation relationship. The data management module 704b may perform cooperative data management with the at least one cooperative gateway after the cooperation is established with the at least one cooperative gateway.

In some examples of this embodiment, after determining the at least one cooperative gateway, for example, after receiving the cooperation configuration information sent by the central gateway, the relationship management module 704a may initiate a cooperation establishment request to the at least one cooperative gateway, so as to establish cooperation with the at least one cooperative gateway. In other examples, the relationship management module 704a may receive a cooperation establishment request initiated by the at least one cooperative gateway, and establish cooperation with the at least one cooperative gateway according to the cooperation establishment request.

It can be understood that, for an IoT gateway, when the IoT gateway establishes cooperation with its own cooperative gateway, the IoT gateway can decide whether to act as a requester or a responder according to situations. Hence, in some examples of this embodiment, the relationship management module 704a may have both the capability of initiating a cooperation establishment request and the capability of responding to the cooperation establishment request. It is assumed in the following that an IoT gateway where the device 70 for implementing the gateway cooperation is deployed is a first gateway serving as a request initiator.

First, the first gateway and the second gateway establish cooperation. After receiving the cooperation configuration information from the central gateway, the relationship management module 704a of the first gateway may determine, according to the cooperation configuration information, the second gateway configured by the central gateway for the first gateway, and then send a cooperation establishment request to the second gateway, so as to request to establish cooperation with the second gateway. After receiving the cooperation establishment request, the second gateway may establish cooperation with the first gateway in response to the cooperation establishment request of the first gateway, thereby implementing cooperative management of data between the first gateway and the second gateway.

For any one of the IoT gateways in the IoT network, after receiving a cooperation establishment request sent by another IoT gateway, it represents that the IoT gateway has already been selected by the central gateway as a cooperative gateway of the gateway sending the cooperation establishment request. In this case, the IoT gateway can firstly determine whether the IoT gateway itself can serve as a cooperative gateway of the gateway sending the cooperation establishment request. For example, the IoT gateway firstly determines whether resources of the current IoT gateway meet a demand for cooperative data management of the gateway sending the cooperation establishment request, and if the determination result is positive, the IoT gateway allocates, in responsive to the cooperative establishment request of the gateway sending the cooperation establishment request, cooperation resources used for cooperative data management to the gateway sending the cooperation establishment. It can be understood that, in this embodiment, the cooperative data management is bidirectional, that is, one IoT gateway A is a cooperative gateway of another IoT gateway B, and the IoT gateway B is also a cooperative gateway of the IoT gateway A, so the IoT gateway A and the IoT gateway B are cooperative gateways of each other.

After the second gateway responds to the cooperation establishment request of the first gateway, the first gateway and the second gateway serve as cooperative gateways of each other, and the data management module 704b may perform cooperative data management together with the second gateway. The cooperative data management performed by the second gateway and the first gateway includes at least one of the following types of data management:

(1) The data management module 704b sends data collected by the current gateway in a first data backup period to the second gateway;

(2) The data management module 704b receives and stores data which is collected by the second gateway within a second data backup period and sent by the second gateway;

(3) The data management module 704b receives a backup data deletion instruction sent by the cooperative gateway of the current gateway, and deletes, according to the backup data deletion instruction, data which is collected by the cooperative gateway within a third data backup period and is stored in the current gateway;

(4) The data management module 704*b* uploads, according to a backup data recovery instruction sent by an application server, data which is collected by the cooperative gateway of the current gateway in a fourth data backup period and is stored in the current gateway; and (5) The data management module 704*b* uploads, after the second gateway is offline, data of the second gateway stored in the current gateway to an application server.

The process of cooperative data management between the first gateway and the second gateway is further described below.

The data management (1) and (2) mentioned above relate to the data backup management between the data management module 704*b* and the second gateway. The data management (1) relates to a process that the data management module 704*b* sends the data collected by the current gateway to the second gateway. It can be understood that the data management module 704*b* sends the data collected by the current gateway to the second gateway periodically, and the first data backup period is the period according to which the data management module 704*b* sends data to the second gateway. It can be understood that, in a first data backup period, the data that the data management module 704*b* sends to the second gateway is the data that is collected by the current gateway in the first data backup period. The data management (2) relates to a process that the data management module 704*b* receives data sent by the second gateway and performs backup management. Similarly, the second gateway generally sends data to the data management module 704*b* periodically, and the second data backup period is the period according to which the second gateway sends data to the data management module 704*b*. The data sent by the second gateway to the data management module 704*b* during the second data backup period is also the data collected by the second gateway during the second data backup period.

In some examples of this embodiment, data collected by the first gateway and data collected by the second gateway may be backed up and stored between the first gateway and the second gateway, or even simply processed. In an example of the embodiment, a first IoT gateway and a second IoT gateway are cooperative gateways of each other, and the first IoT gateway may send data collected within the first data backup period by the first gateway to the second IoT gateway for storage. In addition, the second IoT gateway also sends the data collected by the second IoT gateway within the second data backup period to the first IoT gateway for backup storage. In some examples of this embodiment, the first data backup period may be equal to the second data backup period, that is, the first IoT gateway and the second IoT gateway send the data collected by the current gateway in the latest data backup period to each other at the same time interval. For example, assuming that the data backup period is 1 hour, the first IoT gateway sends to the second IoT gateway data collected by the first IoT gateway within the last 1 hour according to the period duration of 1 hour, and likewise, the second IoT gateway sends to the first IoT gateway data collected by the second IoT gateway within the last 1 hour according to the period duration of 1 hour.

The cooperative data management process involved in the data management (3) is introduced below.

Generally, when one IoT gateway periodically sends data to its own cooperative gateway so that the cooperative gateway backs up the data collected by the IoT gateway, the data collected by the IoT gateway is also uploaded to the application server. For example, after the IoT gateway sends the data collected by the IoT gateway in the third data backup period to its own cooperative gateway, the IoT gateway also uploads this part of the data to the application server. After determining that the data collected in the third data backup period has been successfully uploaded to the application server, the IoT gateway may send a "backup data deletion instruction" to its own cooperative gateway, and this "backup data deletion instruction" is used to instruct the cooperative gateway to delete the data which is collected by the IoT gateway in the third data backup period and is backed up and stored by the cooperative gateway. Hence, after the cooperative gateway receives the backup data deletion instruction from the IoT gateway, the data management module of the cooperative gateway deletes, according to the backup data deletion instruction, the data which is collected by the IoT gateway in the third data backup period and is locally stored in the cooperative gateway.

The cooperative data management process involved in the data management (4) is introduced below.

It can be seen from the above description that, in general, an IoT gateway not only sends data collected by the IoT gateway in a data backup period to its own cooperative gateway, so that the cooperative gateway backs up the data, but also uploads the data collected in the data backup period to an application server. However, in some cases of this embodiment, the cooperative gateway of the IoT gateway receives and acquires data collected by the IoT gateway in a certain data backup period, but the application server cannot acquire the data collected by the IoT gateway in the data backup period. For example, assuming that after the IoT gateway sends data collected by the IoT gateway in a fourth data backup period to its own cooperative gateway, the IoT gateway becomes failed or offline, the IoT gateway has not been able to successfully upload the data collected within the fourth data backup period to the application server, in such a case, the application server may need to acquire the data which is collected by the IoT gateway within the fourth data backup period from the cooperative gateway of the IoT gateway. Hence, the application server may send a "backup data recovery indication" to the cooperative gateway of the IoT gateway, to instruct the cooperative gateway of the IoT gateway to upload the data collected by the IoT gateway within the fourth data backup period. Hence, from the perspective of the cooperative gateway of the IoT gateway, the data management module of this cooperative gateway uploads the stored data collected by the cooperative gateway of the current gateway in the fourth data backup period according to the backup data recovery instruction sent by the application server.

For a certain IoT gateway, if it is detected that a certain cooperative gateway of the IoT gateway is offline, the relationship management module 704*a* of the IoT gateway may report, to the central gateway, a message that the cooperative gateway has been offline, so that the central gateway manages data of the cooperative gateway and a corresponding cooperation relationship. For example, because the cooperative gateway is offline, one or more gateways that originally established cooperation with the cooperative gateway do not have a cooperative gateway any more, the central gateway needs to reconfigure at least one cooperative gateway for the IoT gateways that do not have a cooperative gateway.

In some examples of this embodiment, after a certain IoT gateway determines that a certain cooperative gateway of the IoT gateway is offline, the data of the cooperative gateway stored in the current gateway may also be sent to the application server. It can be understood that, when an IoT gateway is not offline yet, the IoT gateway generally sends data collected by the IoT gateway to the application server periodically, and the data sending period may be the same as or different from a period in which the IoT gateway sends data to the cooperative gateway. Hence, after the IoT gateway is offline, when the cooperative gateway of the IoT gateway uploads data of the IoT gateway stored in the cooperative gateway to the application server, it is not necessary to upload all the data, but only the data designated by the application server. For example, assuming that gateways A and B are cooperative gateways, and when gateway B detects that gateway A is offline, the data of gateway A stored in gateway B may be uploaded to the application server. In some examples, gateway B may only send data specified by the application server to the application server. For example, after the gateway B determines that gateway A is offline, the start time and the end time of the locally stored data of gateway A is sent to the application server. The application server specifies a time period from the start time and the end time, and then gateway B sends the data in the time period specified by the application server to the application server.

In some examples of this embodiment, the IoT gateway in the IoT network only performs a part of the foregoing three flows. In more examples of this embodiment, the IoT gateway simultaneously performs the foregoing three flows.

In addition to cooperative data management, the relationship management module 704a in the management module 704 is required to manage the cooperation relationship with the cooperative gateway. In some examples of this embodiment, after cooperation is established between at least two IoT gateways, the cooperation relationship may also be removed according to requirements of each IoT gateway. For example, assuming that two IoT gateways, B and D, are cooperative gateways of each other, when gateway B needs to release the cooperation relationship with gateway D, gateway B may send a cooperation removal request to the central gateway, requesting the central gateway to remove the cooperation relationship between gateway B and gateway D, and re-configure a new cooperative gateway for gateway B or gateway D when needed by gateway B or gateway D. It can be understood that after gateways B and D remove the cooperation relationship between each other, gateways B and D do not perform cooperative data management any more. Gateway B may release cooperation resources that it allocates to gateway D, and Gateway D may also delete cooperation resources that it allocates to gateway B. Hence, when managing the cooperation relationship, the relationship management module 704a may actively remove the cooperation relationship with the corresponding cooperative gateway, or remove the cooperation relationship between the current gateway and the cooperative gateway when requested by the cooperative gateway.

Figure 10:
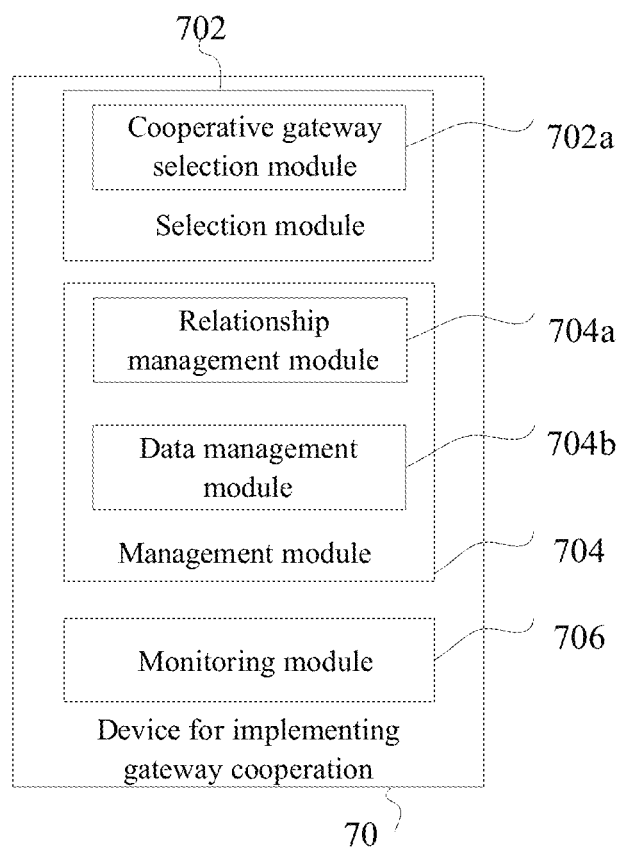
FIG. 10 is a schematic diagram of a fourth structure of a device for implementing gateway cooperation according to Embodiment 3 of the present disclosure.

In some examples of this embodiment, referring to FIG. 10, the device 70 for implementing the gateway cooperation may further include a monitoring module 706, configured to monitor a live status of at least one cooperative gateway of the current gateway, and report the live status to the central gateway when it is determined that a cooperative gateway of the current gateway is offline.

For a certain IoT gateway, if the monitoring module 706 deployed thereon monitors that a certain cooperative gateway of the IoT gateway is in an offline state, a message that the cooperative gateway has been offline may be reported to the central gateway, so that the central gateway manages data of the cooperative gateway and performs corresponding system management. For example, because the cooperative gateway is offline, one or more gateways that originally established cooperation with the cooperative gateway do not have a cooperative gateway any more, the central gateway needs to reconfigure the cooperative gateway for the IoT gateways that do not have a cooperative gateway.

According to the device for implementing the gateway cooperation provided in this embodiment, various gateways in an IoT network first automatically elect a central gateway in the current IoT network, and then the central gateway allocates at least one cooperative gateway to each gateway in the IoT network, thereby addressing the problems of poor flexibility and poor extensibility of a gateway cooperation implementation solution caused by configuring the cooperative gateway by network management personnel. In addition, the central gateway is also elected and determined by the gateways in the IoT network, and the selection of the central gateway is not based on a single node status parameter but based on a performance mean value of at least two node status parameters; therefore, the selected central gateway has a stronger comprehensive capability, and is more stable when gateway cooperation is implemented.

Embodiment 4

Figure 11:
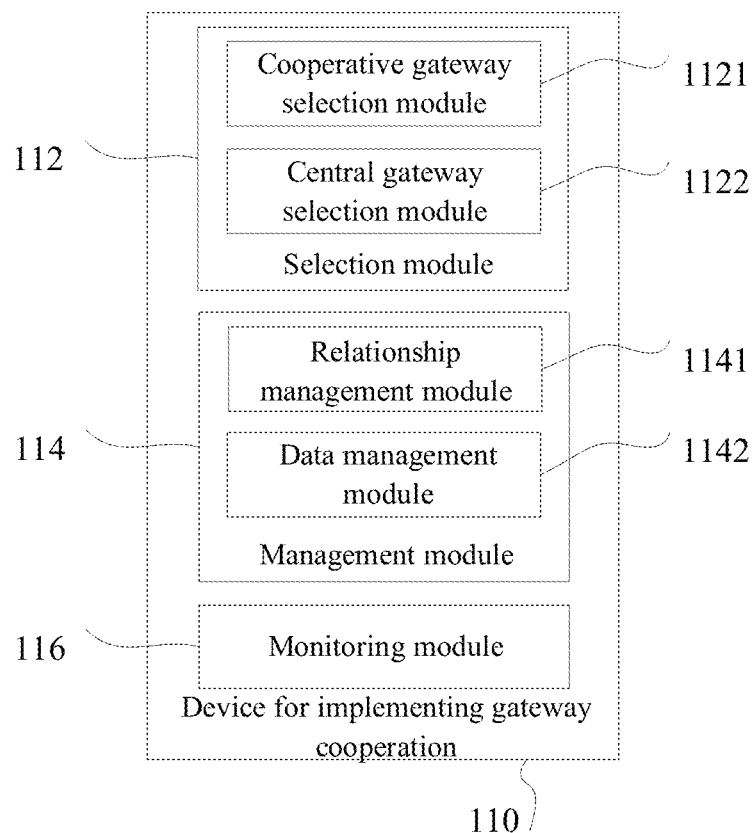
FIG. 11 is a schematic diagram of a structure of a device for implementing gateway cooperation according to Embodiment 4 of the present disclosure.

This embodiment provides a device for implementing gateway cooperation. The device for implementing the gateway cooperation may be deployed in an IoT gateway. Please refer to FIG. 11, the device 110 for implementing the gateway cooperation includes: a selection module 112, configured to implement central gateway selection and cooperative gateway selection of the IoT gateway; a management module 114, configured to implement cooperation relationship management and cooperative data management of the IoT gateway; and a monitoring module 116, configured to implement a cooperative gateway monitoring function of the IoT gateway.

The selection module 112 includes: a central gateway selection module 1121 and a cooperative gateway selection module 1122. The central gateway selection module 1121 is configured to acquire a weighted mean value of the IoT gateway, and determine an IoT gateway having the maximum weighted mean value in the IoT network as a central gateway in the IoT network. The cooperative gateway selection module 1122 is configured to configure encoding information for each IoT gateway in the IoT network, acquire the encoding information of the target gateway when it is required to allocate at least one cooperative gateway to the target gateway, and select, from multiple gateways in the IoT network, at least one cooperative gateway meeting a preset requirement for the target gateway based on the encoding information of the target gateway.

The management module 114 includes a relationship management module 1141 and a data management module 1142. The relationship management module 1141 is configured to determine whether local resources satisfy a service requirement of the cooperative gateway before confirming the establishment of cooperation, and allocate cooperation resources to the cooperative gateway when it is determined that the local resources satisfy the service requirement; and remove local resources related to the cooperative gateway before confirming the removal of the cooperation relationship. The data management module 1142 is configured to send data information to the cooperative gateway of the IoT gateway according to a predefined first period, and upload the original data information to the application server according to a predefined second period; and when a cooperative gateway is offline, send data information of the cooperative gateway to the IoT application server.

According to the above solution, the monitoring module 116 is configured to monitor the live status of the cooperative gateway according to the received live information of the cooperative gateway. When the live status represents that the cooperative gateway of the IoT gateway is offline, the monitoring module 116 notifies the central gateway that the cooperative gateway of the IoT gateway has been offline, and the central gateway determines the offline state of the cooperative gateway of the IoT gateway, and adjusts the cooperation relationship of the managed IoT gateways according to the current topology states of the IoT gateway and the cooperative gateway of the IoT gateway.

The embodiment also provides a method for implementing gateway cooperation. The method includes the following operations. When an IoT network is constructed and an IoT network topology is changed, a central IoT gateway of the IoT network is determined. The central IoT gateway is responsible for configuring encoding information for each IoT gateway in the IoT network, and allocating at least one cooperative gateway to each IoT gateway in the IoT network according to the encoding information.

On the one hand, after the IoT gateway establishes cooperation with at least one cooperative gateway of the IoT gateway, the cooperation relationship can be removed.

On the other hand, the IoT gateway sends data information to the cooperative gateway of the IoT gateway and uploads the data information to the application server according to a preset period. The IoT gateway monitors the live status of the cooperative gateway according to the received live information of the cooperative gateway of the IoT gateway.

With regard to the process of determining a central gateway, when an IoT network is constructed, any IoT gateway in the network determines a weighted mean value of the IoT gateway based on node parameters of the IoT gateway, and determines an IoT gateway having the maximum weighted mean value in the network as the central gateway of the network. When an IoT network topology is changed, for example, when an IoT gateway is newly added to a network or the weighted mean value of an IoT gateway changes, a current central gateway of the network acquires a weighted mean value of the IoT gateway, and changes the central gateway of the network to this IoT gateway when the weighted mean value of the current central gateway is less than the weighted mean value of this IoT gateway.

The process of allocating at least one cooperative gateway for the IoT gateway by the central gateway includes the following operations. Multiple pieces of encoding information of multiple IoT gateways in the IoT network are acquired, and at least one IoT gateway satisfying a preset requirement is selected from the multiple IoT gateways as the cooperative gateway of the target gateway according to the multiple pieces of encoding information and the encoding information of the target gateway. When an IoT gateway is newly added to an IoT network, the IoT gateway without an optimal cooperative gateway in the network is acquired, and a cooperative gateway is re-allocated to the IoT gateway.

The process of establishing or removing the cooperation relationship includes the following operations. Before establishing the cooperation with the at least one cooperative gateway selected by the central gateway, the IoT gateway needs to request the at least one cooperative gateway to establish the cooperation. Before confirming the establishment of the cooperation, the cooperative gateway determines whether local resources satisfy a service requirement of the IoT gateway, and allocates cooperation resources for the IoT gateway. When the cooperative gateway is reselected or when the cooperative gateway disconnects, before confirming removal of the cooperation relationship, the cooperative gateway locally removes the cooperation resources of the IoT gateway.

The process of sending and uploading data information includes the following operations. The IoT gateway sends data information to at least one cooperative gateway of the IoT gateway according to a preset first period, and uploads original data information to an application server according to a preset second period. When the IoT gateway is offline, the at least one cooperative gateway sends data information of the IoT gateway to the application server.

The process of monitoring the live status of the cooperative gateway includes the following operations. The IoT gateway monitors the live status of the cooperative gateway according to the time interval between the last received live information of the cooperative gateway and the currently received live information of the cooperative gateway, and according to the time interval between the last generated live information of the cooperative gateway and the currently generated live information of the cooperative gateway.

The method and device for implementing the gateway cooperation provided in the embodiments have the following advantages. By modifying an IoT gateway, the IoT gateway can meet a demand of an application for the IoT gateway, and can be flexibly applied to various cooperation scenarios. For example, in the traditional selection of a central gateway, the main purpose is to provide a transit/relay or temporary storage service for gateways in the network, and indicators such as an energy value, power and bandwidth of the gateway are main factors for selecting the central gateway. However, in the embodiments of the present disclosure, a weighted mean value corresponding to node parameters is taken as a selection basis to make the selection more effective. In the process of establishing the cooperation relationship, the embodiments of the present disclosure takes resource requirements of services into account, and thus are more reasonable. In addition, the encoding information configured for each gateway can also represent application-related information of the gateway, for example, in a scenario of monitoring data interaction in an office building, the encoding information is configured for each gateway according to an association relationship among the gateway, fire fighting monitoring devices and controlled devices, so that the selection of the cooperative gateway is more targeted.

In this embodiment, the cooperation is applied to the entire IoT system, and the cooperation relationship can be flexibly changed for different IoT networks, thereby implementing the cooperation of IoT gateways, and greatly improving processing capabilities of the IoT gateways. In addition, the solution is highly extensible, and can satisfy different application scenarios.

Embodiment 5

This embodiment provides a storage medium. The storage medium may store one or more computer programs that can be read, compiled and executed by one or more processors. In this embodiment, the storage medium may store a program for implementing gateway cooperation. The program for implementing the gateway cooperation may be executed by one or more processors to perform operations of the method for implementing the gateway cooperation described in the foregoing embodiments.

Figure 12:
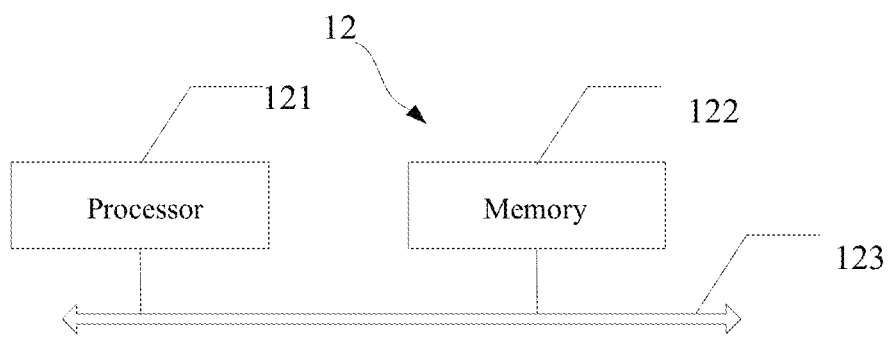
FIG. 12 is a schematic diagram of a hardware structure of an IoT gateway according to Embodiment 5 of the present disclosure.

This embodiment also provides an IoT gateway, as shown in FIG. 12, the IoT gateway 12 includes a processor 121, a memory 122, and a communication bus 123 configured to connect the processor 121 and the memory 122. The memory 122 may be the foregoing storage medium storing a program for implementing gateway cooperation, and the processor 121 may read, compile and execute the program for implementing the gateway cooperation to perform operations of the method for implementing the gateway cooperation described in the foregoing embodiments.

When the IoT gateway 12 serves as a central gateway, the processor 121 may select at least one cooperative gateway for the target gateway from the gateways in the IoT network, and notify the target gateway of the at least one cooperative gateway. The at least one cooperative gateway is used for establishing cooperation with the target gateway and performing cooperative management.

Before this operation, the processor 121 may further perform central gateway election in the IoT network together with other gateways in the IoT network.

In some examples of this embodiment, the processor 121 may establish cooperation with the at least one cooperative gateway of the IoT gateway 12, and manage the cooperation relationship. In addition, after the IoT gateway 12 establishes the cooperation with the at least one cooperative gateway, the processor 121 may also perform cooperative data management together with the at least one cooperative gateway.

For details concerning how the IoT gateway 12 implements the method for implementing the gateway cooperation, reference may be made to the description of the foregoing embodiments, and details are not described herein repeatedly.

Figure 13:
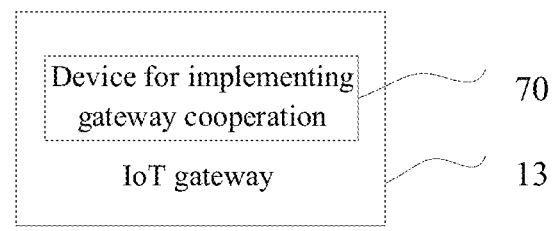
FIG. 13 is a schematic diagram of a structure of an IoT gateway according to Embodiment 5 of the present disclosure.

This embodiment provides an IoT gateway. As shown in FIG. 13, the IoT gateway 13 includes the device 70 for implementing the gateway cooperation provided in the foregoing embodiments.

It should be understood by those having ordinary skill in the art that the method and device for implementing gateway cooperation, the gateway, and the storage medium provided in the embodiments of the present disclosure may not only be applied to an existing communication system, but also be applied to any future communication system.

In the present disclosure, technical features in respective embodiments may be combined to form one embodiment if there is no conflict.

Obviously, those having ordinary skill in the art should understand that the functional modules/units in all or some of the operations, systems and devices in the methods described above may be implemented as software (which may be implemented by a program code executable by a computing device), firmware, hardware or appropriate combinations thereof. In a hardware implementation, the division between functional modules/units referred to in the above description does not necessarily correspond to the division of physical components. For example, one physical component may have multiple functions, or one function or operation may be cooperatively performed by several physical components. Some or all of the physical components may be implemented as software executed by a processor, such as a central processor, or digital signal processor, or microprocessor. Alternatively, some or all of the physical components may be implemented as hardware, or as an integrated circuit, such as an application specific integrated circuit. Such software may be distributed on a computer readable medium for execution by a computing device. In some cases, the operations shown or described may be executed in sequences different from those described herein. The computer readable medium may include a computer storage medium (or a non-transitory medium) and a communication medium (or a transitory medium). As is well known to those having ordinary skill in the art, the term computer storage medium includes volatile and non-volatile, removable and non-removable media implemented in any method or technology for storing information (such as computer readable instructions, data structures, program modules, or other data). Computer storage media includes, but is not limited to, RAM, ROM, EEPROM, flash memory or other memory technology, CD-ROM, digital versatile discs (DVD) or other optical disk storage, magnetic cassettes, magnetic tape, magnetic disk storage or other magnetic storage devices, or any other medium which can be used to store the desired information and which can be accessed by a computer. In addition, communication media typically includes computer readable instructions, data structures, program modules, or other data in a modulated data signal such as a carrier wave or other transport mechanism, and may include any information delivery media as is known to those having ordinary skill in the art. Hence, the present disclosure is not limited to any particular hardware and software combination.

The above content further describes the embodiments of the present disclosure in detail with reference to exemplary embodiments, but the embodiments of the present disclosure are only limited to these descriptions. For those having ordinary skill in the art to which the present disclosure belongs, on the premise of not departing from the conception of the embodiments of the present disclosure, a number of simple deductions or replacements can also be made, all of which should be considered to belong to the protection scope defined by the appended claims of the present disclosure.

The invention claimed is:

1. A device for implementing gateway cooperation, comprising a memory storing instructions and a processor in communication with the memory, wherein the processor is configured to execute the instructions to:
   select, from gateways in an Internet of Things (IoT) network, at least one cooperative gateway for a target gateway, and notify the target gateway of the at least one cooperative gateway, wherein the at least one cooperative gateway is used for establishing cooperation with the target gateway and performing cooperative management, wherein the processor is further configured to execute the instructions to:
   perform central gateway election in the IoT network together with other gateways in the IoT network, wherein the processor, when configured to select, from the gateways in the IoT network, the at least one cooperative gateway for the target gateway, is configured to: acquire deployment and configuration information of gateways in the IoT network, and select the at least one cooperative gateway for the target gateway according to differences between the deployment and configuration information of candidate gateways and the deployment and configuration information of the target gateway, wherein the candidate gateways are gateways except the target gateway in the IoT network.

2. The device for implementing the gateway cooperation according to claim 1, wherein the processor, when configured to select the at least one cooperative gateway for the target gateway according to the differences between the deployment and configuration information of the candidate gateways and the deployment and configuration information of the target gateway, is configured to: select, from the candidate gateways, at least one gateway with a maximum difference between the deployment and configuration information of the at least one gateway and the deployment and configuration information of the target gateway as the at least one cooperative gateway of the target gateway.

3. The device for implementing the gateway cooperation according to claim 1, wherein the processor, when configured to perform the central gateway election in the IoT network together with the other gateways in the IoT network, is configured to: select, together with the other gateways in the IoT network, a central gateway according to a performance mean value of each gateway in the IoT network, wherein the performance mean value of each gateway is determined according to at least two node status parameters of the gateway.

4. The device for implementing the gateway cooperation according to claim 3, wherein the performance mean value of the gateway is a weighted mean value of at least two node status parameters of the gateway calculated according to a preset relationship, wherein the preset relationship comprises a preset weight coefficient of each node status parameter.

5. The device for implementing the gateway cooperation according to claim 3, wherein the processor, when configured to select, together with the other gateways in the IoT network, the central gateway according to the performance mean value of each gateway in the IoT network, is configured to:
exchange, with a first neighboring gateway of a current gateway, identification information and a performance mean value of a gateway with a maximum performance mean value known to each other;
compare the performance mean value acquired from the first neighboring gateway with the maximum performance mean value known to the current gateway; and
exchange, with a second neighboring gateway of the current gateway, the identification information and the performance mean value of the gateway with the maximum performance mean value known to each other, so that the second neighboring gateway continues to conduct exchange with other gateways to elect a gateway with a maximum performance mean value in the IoT network as the central gateway in the IoT network.

6. The device for implementing the gateway cooperation according to claim 3, wherein the processor is further configured to execute the instructions to:
select a gateway with a performance mean value immediately less than a performance mean value of the current central gateway as a backup central gateway, wherein the backup central gateway is used for operating in place of the central gateway after central gateway switching.

7. The device for implementing the gateway cooperation according to claim 6, wherein the processor is further configured to execute the instructions to:
determine, when performing the central gateway switching, that a change value of the performance mean value of the backup central gateway after becoming the backup central gateway is within a preset range, transfer data of the current gateway to the backup central gateway, and notify other gateways in the IoT network that the backup central gateway becomes a new central gateway.

8. The device for implementing the gateway cooperation according to claim 1, wherein the processor is further configured to execute the instructions to:
establish a cooperation relationship with the at least one cooperative gateway of the current gateway, and manage the cooperation relationship; and the processor is further configured to execute the instructions to perform cooperative data management with the at least one cooperative gateway of the current gateway.

9. The device for implementing the gateway cooperation according to claim 8, wherein the processor, when configured to establish the cooperation relationship with the at least one cooperative gateway of the current gateway, is configured to: establish the cooperation relationship with the at least one cooperative gateway of a current gateway after determining that resources of the current gateway meet a service requirement for cooperation of the at least one cooperative gateway of the current gateway.

10. The device for implementing the gateway cooperation according to claim 9, wherein the processor is further configured to execute the instructions to: remove the cooperation relationship with the at least one cooperative gateway of the current gateway, and delete cooperation resources allocated by the current gateway to the at least one cooperative gateway of the current gateway.

11. The device for implementing the gateway cooperation according to claim 8, wherein the processor, when configured to perform the cooperative data management with the at least one cooperative gateway of the current gateway, is configured to implement at least one of the following types of data management:
sending data collected by the current gateway in a first data backup period to the at least one cooperative gateway of the current gateway;
receiving and storing data which is collected by the at least one cooperative gateway of the current gateway in a second data backup period and sent to the current gateway by the at least one cooperative gateway of the current gateway;
receiving a backup data deletion instruction sent by at least one cooperative gateway of the current gateway, and deleting, according to the backup data deletion instruction, data which is collected by the at least one cooperative gateway of the current gateway in a third data backup period and is stored in the current gateway;
uploading, according to a backup data recovery instruction sent by an application server, data which is collected by the at least one cooperative gateway of the current gateway in a fourth data backup period and is stored in the current gateway; and
uploading, after at least one cooperative gateway of the current gateway is offline, data of the at least one cooperative gateway stored in the current gateway to an application server.

12. The device for implementing the gateway cooperation according to claim 1, wherein the processor is further configured to execute the instructions to:
monitor a live status of the at least one cooperative gateway of the current gateway, and report to a central gateway when determining that one or more cooperative gateways of the current gateway is/are offline.

13. The device for implementing the gateway cooperation according to claim 1, wherein the processor, when configured to select the at least one cooperative gateway for the target gateway according to the differences between the deployment and configuration information of the candidate gateways and the deployment and configuration information of the target gateway, is configured to: select, from the candidate gateways, at least one gateway for which the difference between the deployment and configuration information of the at least one gateway and the deployment and configuration information of the target gateway meets a requirement as the at least one cooperative gateway of the target gateway.

14. The device for implementing the gateway cooperation according to claim 1, wherein the deployment and configuration information of a gateway represents at least one of the following: location information of the gateway, a topological relationship, and service information carried by the gateway.

15. A method for implementing gateway cooperation performed by a gateway, the method comprising:
    selecting, from gateways in an Internet of Things (IoT) network, at least one cooperative gateway for a target gateway;
    notifying the target gateway of the at least one cooperative gateway, wherein the at least one cooperative gateway is used for establishing cooperation with the target gateway and performing cooperative management, wherein the method further comprises: performing central gateway election in the IoT network together with other gateways in the IoT network, wherein the method further comprises: selecting, from the gateways in the IoT network, the at least one cooperative gateway for the target gateway, is configured to: acquire deployment and configuration information of gateways in the IoT network, and select the at least one cooperative gateway for the target gateway according to differences between the deployment and configuration information of candidate gateways and the deployment and configuration information of the target gateway, wherein the candidate gateways are gateways except the target gateway in the IoT network.

16. An Internet of Things (IoT) gateway, comprising a device for implementing gateway cooperation, wherein the device for implementing the gateway cooperation comprises a memory storing instructions and a processor in communication with the memory, wherein the processor is configured to execute the instructions to:
    select, from gateways in an Internet of Things (IoT) network, at least one cooperative gateway for a target gateway, and notify the target gateway of the at least one cooperative gateway, wherein the at least one cooperative gateway is used for establishing cooperation with the target gateway and performing cooperative management, wherein the processor is configured to execute the instructions to:
    perform central gateway election in the IoT network together with other gateways in the IoT network, wherein the processor is configured to execute the instructions to select, from the gateways in the IoT network, the at least one cooperative gateway for the target gateway, is configured to: acquire deployment and configuration information of gateways in the IoT network, and select the at least one cooperative gateway for the target gateway according to differences between the deployment and configuration information of candidate gateways and the deployment and configuration information of the target gateway, wherein the candidate gateways are gateways except the target gateway in the IoT network.

17. A non-transitory computer-readable storage medium, storing a program for implementing gateway cooperation, and the program for implementing the gateway cooperation, when being executed by one or more processors, causes the one or more processors to implement operations of the method for implementing the gateway cooperation according to claim 3.

* * * * *